US008660035B2

(12) United States Patent
Zhang et al.

(10) Patent No.: US 8,660,035 B2
(45) Date of Patent: *Feb. 25, 2014

(54) WIRELESS RELAY NETWORK MEDIA ACCESS CONTROL LAYER CONTROL PLANE SYSTEM AND METHOD

(75) Inventors: Hang Zhang, Nepean (CA); Mo-Han Fong, L'Original (CA); Peiying Zhu, Kanata (CA); Jianglei Ma, Kanata (CA); Wen Tong, Ottawa (CA)

(73) Assignee: Apple, Inc., Cupertino, CA (US)

( * ) Notice: Subject to any disclaimer, the term of this patent is extended or adjusted under 35 U.S.C. 154(b) by 1326 days.

This patent is subject to a terminal disclaimer.

(21) Appl. No.: 12/092,797

(22) PCT Filed: Nov. 10, 2006

(86) PCT No.: PCT/CA2006/001842
§ 371 (c)(1),
(2), (4) Date: May 6, 2008

(87) PCT Pub. No.: WO2007/053948
PCT Pub. Date: May 18, 2007

(65) Prior Publication Data
US 2008/0285500 A1    Nov. 20, 2008

Related U.S. Application Data

(60) Provisional application No. 60/735,706, filed on Nov. 10, 2005.

(51) Int. Cl.
*H04L 12/28* (2006.01)
*H04B 7/14* (2006.01)

(52) U.S. Cl.
USPC ............ 370/255; 370/315; 370/328; 370/331

(58) Field of Classification Search
None
See application file for complete search history.

(56) References Cited

U.S. PATENT DOCUMENTS

| 6,055,429 A | 4/2000 | Lynch |
| 7,006,526 B1 | 2/2006 | Biederman |

(Continued)

FOREIGN PATENT DOCUMENTS

| EP | 0999717 A2 | 5/2000 |
| EP | 1206071 A2 | 5/2002 |

(Continued)

OTHER PUBLICATIONS

International Search Report in related Application No. PCT/CA2006/001844, Feb. 23, 2007, pp. 2-4.

(Continued)

*Primary Examiner* — Yemane Mesfin
*Assistant Examiner* — Christine Duong
(74) *Attorney, Agent, or Firm* — Meyertons, Hood, Kivlin, Kowert & Goetzel, P.C.; Eric B. Meyertons

(57) ABSTRACT

A method and system for using a communication network having a relay node to provide wireless communication with a mobile station. A ranging region is established with the mobile station in which the establishment of the ranging region includes the transmission of control information corresponding to the relay node. The mobile station is allowed to enter the communication network. The relay node is used to wirelessly communicate with the mobile station in at least one of the uplink and downlink directions.

30 Claims, 17 Drawing Sheets

(56) References Cited

U.S. PATENT DOCUMENTS

| | | |
|---|---|---|
| 2003/0179742 A1 | 9/2003 | Ogier et al. |
| 2004/0081151 A1 | 4/2004 | Greis et al. |
| 2004/0095907 A1 | 5/2004 | Agee et al. |
| 2004/0114566 A1* | 6/2004 | Lim et al. .................. 370/349 |
| 2004/0147223 A1* | 7/2004 | Cho .............................. 455/41.2 |
| 2005/0094588 A1 | 5/2005 | Wentink |
| 2005/0141593 A1* | 6/2005 | Pasanen et al. ............... 375/130 |
| 2005/0220052 A1* | 10/2005 | Uehara et al. ................ 370/331 |
| 2006/0141929 A1* | 6/2006 | Lockie et al. ................ 455/11.1 |
| 2007/0014252 A1* | 1/2007 | Chung et al. ................. 370/315 |
| 2007/0071035 A1 | 3/2007 | Evans et al. |
| 2007/0076684 A1* | 4/2007 | Lee et al. ..................... 370/350 |
| 2007/0081507 A1* | 4/2007 | Koo et al. .................... 370/338 |

FOREIGN PATENT DOCUMENTS

| | | |
|---|---|---|
| WO | 9839936 A2 | 9/1998 |
| WO | 0147181 A2 | 6/2001 |
| WO | 02087168 A2 | 10/2002 |
| WO | 03084146 A1 | 10/2003 |

OTHER PUBLICATIONS

Zeng et al.; "A Relay Based MAC Protocol to Support Multi-rate Feature in Mobile Ad Hoc Networks:" IEEE Computer Society, Proceedings of the Second Annual International Conference on Mobile and Ubiquitous Systems: Networking and Service 2005, Jul. 17-21, 2005; pp. 145-154.

Non-Final Office Action in related U.S. Appl. No. 12/092,808, Jul. 8, 2011, pp. 1-16.

* cited by examiner

WIRELESS RELAY NETWORK MEDIA ACCESS CONTROL LAYER CONTROL PLANE SYSTEM AND METHOD

CROSS-REFERENCE TO RELATED APPLICATIONS

This application is a Submission Under 35 U.S.C. §371 for U.S. National Stage Patent Application of International Application Number: PCT/CA2006/001842, filed 10 Nov. 2006, entitled WIRELESS RELAY NETWORK MEDIA ACCESS CONTROL LAYER CONTROL PLANE SYSTEM AND METHOD, which is related to and claims priority to U.S. Patent Application Ser. No. 60/735,706, filed 10 Nov. 2005, the entirety of all of which are incorporated herein by reference.

BACKGROUND OF THE INVENTION

1. Statement of the Technical Field

The present invention relates to the field of wireless communications and more particularly to a method and system for providing a media access control ("MAC") layer control plane for wireless relay networks.

2. Description of the Related Art

As the demand for high speed broadband networking over wireless communication links increases, so too does the demand for different types of networks that can accommodate high speed wireless networking. For example, the deployment of IEEE 802.11 wireless networks in homes and business to create Internet access "hot spots" has become prevalent in today's society. However, these IEEE 802.11-based networks are limited in bandwidth as well as distance. For example, maximum typical throughput from a user device to a wireless access point is 54 MB/sec. at a range of only a hundred meters or so. In contrast, while wireless range can be extend through other technologies such as cellular technology, data throughput using current cellular technologies is limited to a few MB/sec. Put simply, as the distance from the base station increase, the need for higher transmission power increases and the maximum data rate typically decreases. As a result, there is a need to support high speed wireless connectivity beyond a short distance such as within a home or office.

As a result of the demand for longer range wireless networking, the IEEE 802.16 standard was developed. The IEEE 802.16 standard is often referred to as WiMAX or less commonly as WirelessMAN or the Air Interface Standard. This standard provides a specification for fixed broadband wireless metropolitan access networks ("MAN"s) that use a point-to-multipoint architecture. Such communications can be implemented, for example, using orthogonal frequency division multiplexing ("OFDM") communication. OFDM communication uses a spread spectrum technique distributes the data over a large number of carriers that are spaced apart at precise frequencies. This spacing provides the "orthogonality" that prevents the demodulators from seeing frequencies other than their own.

The 802.16 standard supports high bit rates in both uploading to and downloading from a base station up to a distance of 30 miles to handle such services as VoIP, IP connectivity and other voice and data formats. Expected data throughput for a typical WiMAX network is 45 MBits/sec. per channel. The 802.16e standard defines a media access control ("MAC") layer that supports multiple physical layer specifications customized for the frequency band of use and their associated regulations. However, the 802.16e standard does not provide support for multi-hop networks.

802.16 networks, such as 802.16j networks, can be deployed as multi-hop networks from the subscriber equipment to the carrier base station. In other words, in multi-hop networks, the subscriber device can communicate with the base station directly or through an intermediate device.

The complexity involved in supporting multi-hop networks in a robust manner necessarily involves sophisticated MAC control layer protocols. Such protocols do not exist. For example, as noted above, the IEEE 802.16e standard does not support multi-hop networks. The IEEE 802.16j standard for supporting multi-hop networks has been proposed, but the standard currently makes no provision for MAC layer control plane support.

It is therefore desirable to have method and system that provides MAC control plane functions to support wireless multi-hop relay networks, including but not limited to those operating in accordance with the IEEE 802.16 standards.

SUMMARY OF THE INVENTION

In accordance with one aspect, the present invention provides a method for using a communication network having a relay node to provide wireless communication with a mobile station. A ranging region is established with the mobile station in which the establishment of the ranging region includes the transmission of control information corresponding to the relay node. The mobile station is allowed to enter the communication network. The relay node is used to wirelessly communicate with the mobile station in at least one of the uplink and downlink directions.

In accordance with another aspect, the present invention provides a system for wirelessly communicating with a mobile station. A stationary relay node ranges with the mobile station, uses MAC control plane messages to establish wireless communications with the mobile station and wirelessly communicates with the mobile station in at least one of the uplink and downlink directions.

In accordance with another aspect, the present invention provides a method for wireless communication using a relay node in which a frame structure is implemented for communication with the relay node. The frame structure includes a downlink sub-frame and an uplink sub-frame. At least a portion of one of the downlink sub-frame and the uplink sub-frame is used to communication with the relay node.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

As an initial matter, reference may be made herein to "data plane" and "control plane." In general, the control plane includes configured or signaled information that determines the overall behavior, mappings, resource allocation and forwarding parameters that can be applied to all connection frames or frames of a service class. Such information is typically established and used to set up the network devices before any payload traffic is transmitted. Data plane refers to the frame processing functions that typically take place in real-time on a frame-by-frame basis.

In accordance with embodiments of the invention various MAC control plane embodiments for use in wireless networks using relays are described. While certain embodiments are discussed in the context of wireless networks operating in accordance with the IEEE 802.16 broadband wireless standard, which is hereby incorporated by reference, the invention is not limited in this regard and may be applicable to other broadband networks including those operating in accordance with other OFDM orthogonal frequency division ("OFDM")-based systems including the 3rd Generation Partnership Project ("3GPP") and 3GPP2 evolutions. Similarly, the present invention is not limited solely to OFDM-based systems and can be implemented in accordance with other system technologies, e.g., CDMA.

Figure 1:
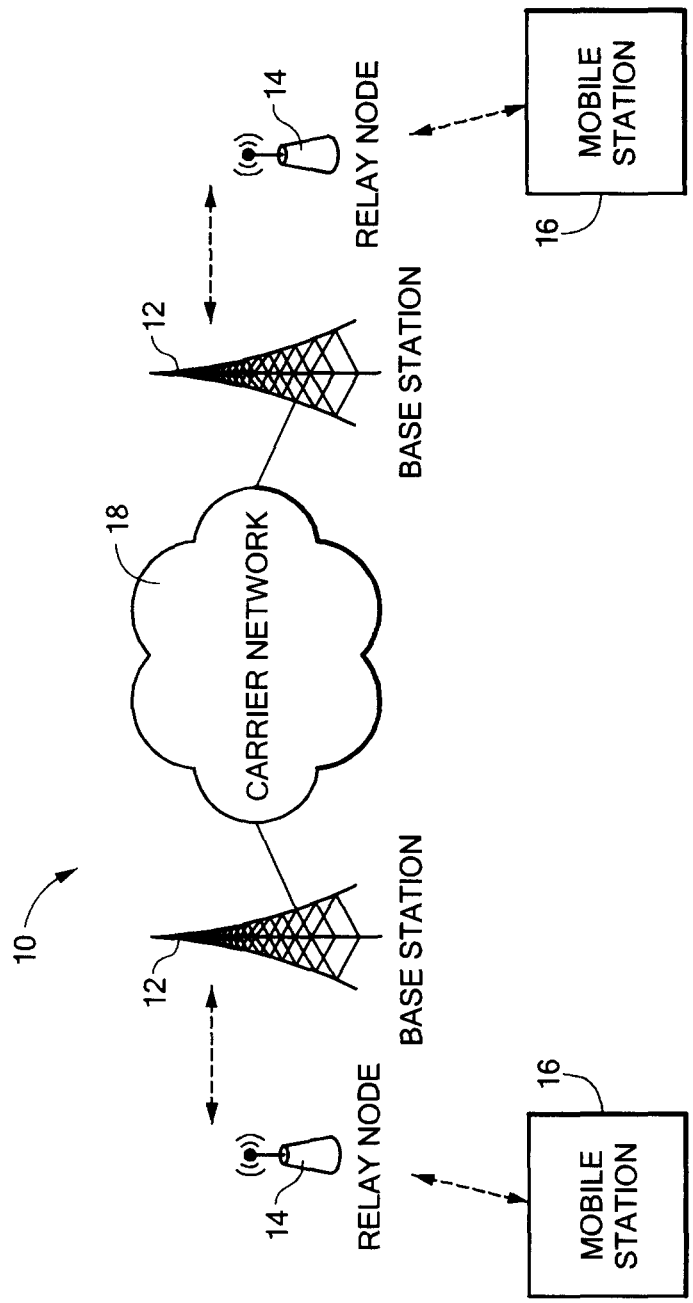
FIG. 1 is a diagram of a system constructed in accordance with the principles of the present invention.

Referring now to the drawing figures in which like reference designators refer to like elements, there is shown in FIG. 1, a system constructed in accordance with the principles of the present invention and designated generally as "10." System 10 includes base stations 12, relay nodes 14 and mobile stations 16. Base stations 12 communicate with one another and with external networks, such as the Internet (not shown), via carrier network 18. Base stations 12 engage in wireless communication with relay nodes 14 and/or mobile stations 16. Similarly, mobile stations 16 engage in wireless communication with relay nodes 14 and/or base stations 12.

Base station 12 can be any base station arranged to wirelessly communicate with relay nodes 14 and/or mobile stations 16. Base stations 12 include the hardware and software used to implement the functions described herein to support the MAC control plane functions. Base stations 12 include a central processing unit, transmitter, receiver, I/O devices and storage such as volatile and nonvolatile memory as may be needed to implement the functions described herein.

Mobile stations 16 can be any mobile station including but not limited to a computing device equipped for wireless communication, cell phone, wireless personal digital assistant ("PDA") and the like. Mobile stations 16 also include the hardware and software suitable to support the MAC control plane functions needed to engage in wireless communication with base station 12 either directly or via a relay node 14. Such hardware can include a receiver, transmitter, central processing unit, storage in the form of volatile and nonvolatile memory, input/output devices, etc.

Relay node 14 is used to facilitate wireless communication between mobile station and base station 12 in the uplink (mobile station 16 to base station 12) and/or the downlink (base station 12 to mobile station 16). A relay node 14 configured in accordance with the principles of the present invention includes a central processing unit, storage in the form of volatile and/or nonvolatile memory, transmitter, receiver, input/output devices and the like. Relay node 14 also includes software to implement the MAC control plane functions described herein. Of note, the arrangement shown in FIG. 1 is general in nature and specific communication embodiments constructed in accordance with the principles of the present invention are described with reference to FIGS. 2-6 below. Of note, according to an embodiment, base stations 12 and relay nodes 14 implemented in accordance with the principles of the present invention are fixed, i.e. non-moving devices, but the invention is not limited to such. It is contemplated that these devices may move. Mobile stations 16 can be fixed, stationary or moving.

FIGS. 2-6 are diagrams showing five different exemplary operational embodiments for base stations 12, relay nodes 14 and mobile stations 16 in accordance with the principles of the present invention. It is noted that carrier network 18 is not shown in FIGS. 2-6 to simplify explanation of the operating embodiments.

Figure 2:
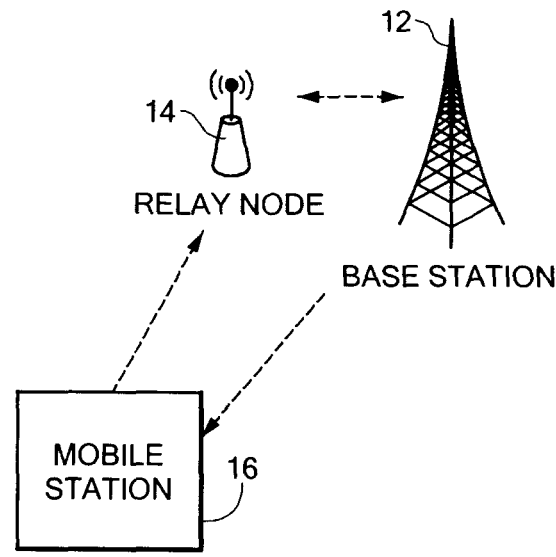
FIG. 2 is a block diagram of a first operational embodiment of the present invention.

FIG. 2 is a diagram showing unbalanced relay operation. As is shown in FIG. 2, mobile station 16 communicates with base station 12 via relay node 14 in the uplink direction only. Base station 12 communicates in the downlink direction directly with mobile station 16. Base station 12 is also shown as engaging in bi-directional communication with relay node 14 so that base station 12 can receive data from mobile station 16 via relay node 14 and engage in MAC control plane communications with relay node 14. The unbalanced relay arrangement shown in FIG. 2 relieves mobile station 16 from concerns over the peak to average power ratio ("PAPR") and reduces the imbalance in the downlink ("DL")/uplink ("UL") link budget. Such occurs, for example, because the base station 12 is capable of much higher power transmission and is much more sensitive on the receiving side than mobile station 16 for wireless communications such as orthogonal frequency division multiplexed ("OFDM") communications. In other words, within a given area supported by base station 12, using an unbalanced communication arrangement such as that shown in FIG. 2 allows a more even transmission power arrangement on the uplink and downlink because mobile station 16 can communicate with relay node 14 in the UL direction, which is presumably closer to mobile station 16 than base station 12 (at least for purposes of the present embodiment). In addition, the present arrangement as is shown in FIG. 2 does not require any implementation or programmatic software changes or enhancements to mobile station 16 or base station 12 with respect to downlink communication because such is accomplished directly between base station 12 and mobile stations 16 as is known in the art.

In the uplink direction, base station 12 schedules uplink transmission for mobile station 16 and relay node 14. Mobile station 16 makes its uplink transmission which is received and decoded by relay node 14. Relay node 14 relays the traffic to base station 12. Instead of ranging to base station 12, mobile station 16 ranges to relay node 14. As used herein, the term "ranging" is used as understood by one of ordinary skill in the art. "Ranging" refers to the process used in OFDM wireless communications to adjust the arrival time for different mobile stations 16 communicating with a single base station 12. The ranging process is also used to establish the transmit power for mobile station 16. The ranging process is analogous to a "handshake" between mobile station 16 and its communication partner, i.e. relay node 14, in the uplink direction. The inclusion of relay node 14 in the embodiment shown in FIG. 2 is transparent to mobile station 16. In other words, because DL communication comes from base station 12 and not relay node 14, mobile station does not know that its UL communication is not directly with base station 12 and is instead with relay node 14. This arrangement provides a suitable low-cost, fixed relay node implementation embodiment. With respect to MAC enhancement, no additional MAC capability, e.g., downlink re-fragmentation, scheduling, etc., is needed in this embodiment.

However, management messages relating to relay node 14 are used to support the functionality described in this embodiment and might include, for example, a relay node report message that allows a relay node to report ranging codes, channel quality index, channel and downlink hybrid automated repeat request ("HARQ") error control method acknowledgement channels and combined uplink traffic HARQ status messages for multiple mobile stations 16. Another MAC management message may include a message sent by base station 12 to relay node ("RN") 14 which enables base station 12 to indicate the uplink connection identification numbers supporting communication sessions.

Figure 3:
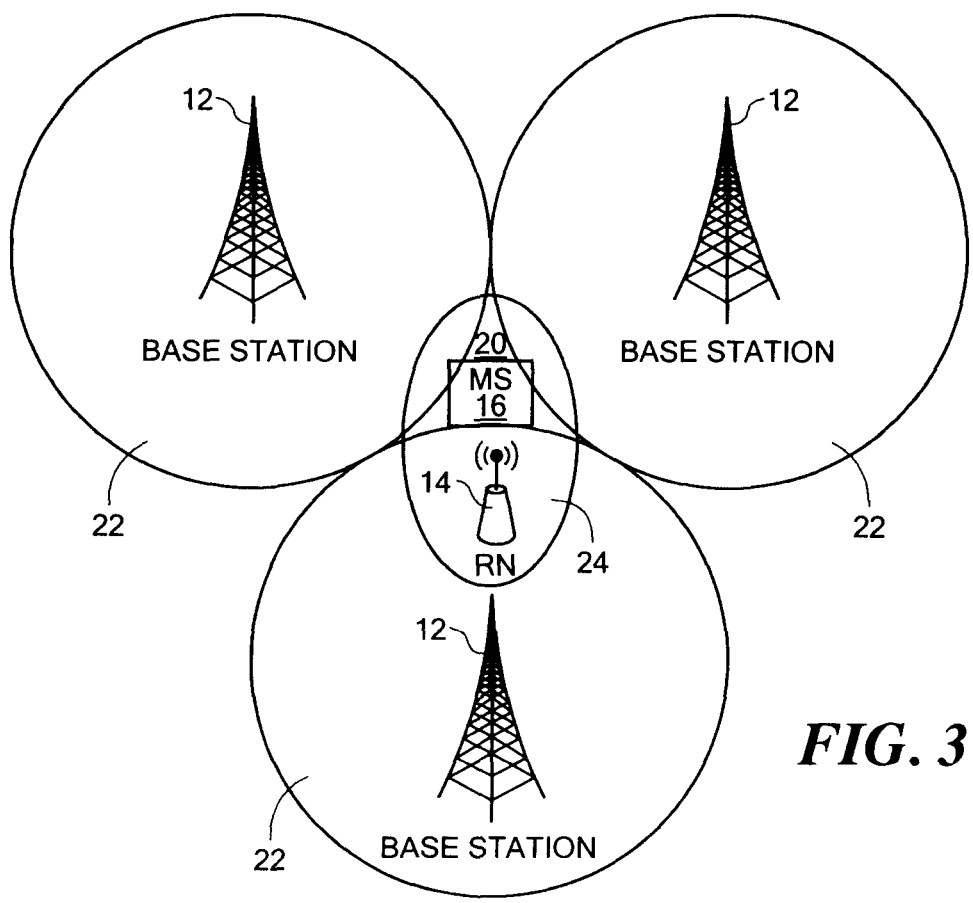
FIG. 3 is a block diagram of a second operational embodiment of the present invention.

A second operational embodiment of the present invention is described with reference to FIG. 3. FIG. 3 shows a coverage hole 20 formed by non-overlapping coverage regions 22 supported by corresponding base stations 12. In other words, each base station 12 supports a coverage region 22 for communication with devices in the corresponding coverage region 22. However, there are situations in which coverage areas 22 may not overlap, thereby forming a "coverage hole" 20. FIG. 3 shows mobile station 16 positioned within coverage hole 20. In such case, absent a solution, mobile station 16 would lose wireless communication with base stations 12. In other words, a mobile station 16 at the edge of a coverage region 22, i.e., cell is unable to decode broadcast control messages transmitted by any of base stations 12. In this case, relay node 14 and its corresponding relay node coverage area 24 provides coverage within coverage hole 20, thereby effectively eliminating the coverage hole and allowing a mobile station 16 in coverage hole 20 to wirelessly communicate with one or more base stations 12. Note, although FIG. 3 shows circular coverage in some areas 22, the present invention is not limited to such. Coverage zones 22 shown in various shapes in the drawing figures purely for ease of explanation and understanding, it being recognized that coverage areas 22 can take the form of different shapes depending on the configuration of the antennas within each base station 12.

In the case of the operational embodiment shown in FIG. 3, relay node 14 operates much like a base station 12 in that it relays all DL broadcast messages to mobile station 16 and relays all DL and UL unicast messages and traffic between mobile station 16 and base station 12. Relay node 14 also manages the ranging operation with respect to its supported mobile stations 16, conducts data scheduling and creates local map messages. Of note, the operation of mobile station 16 is not transparent because base station 12 is transmitting in the downlink to a relay node 14. As such, transmissions to relay node 14 at the MAC layer may be re-fragmented for transmission to base station 12. The data plane aspects of the MAC enhancement are referred to herein as "R-MAC". As is discussed below in detail, a set of messages for communication between relay node 14 and base station 12 to support MAC control plane functions are implemented in accordance with the present invention.

Figure 4:
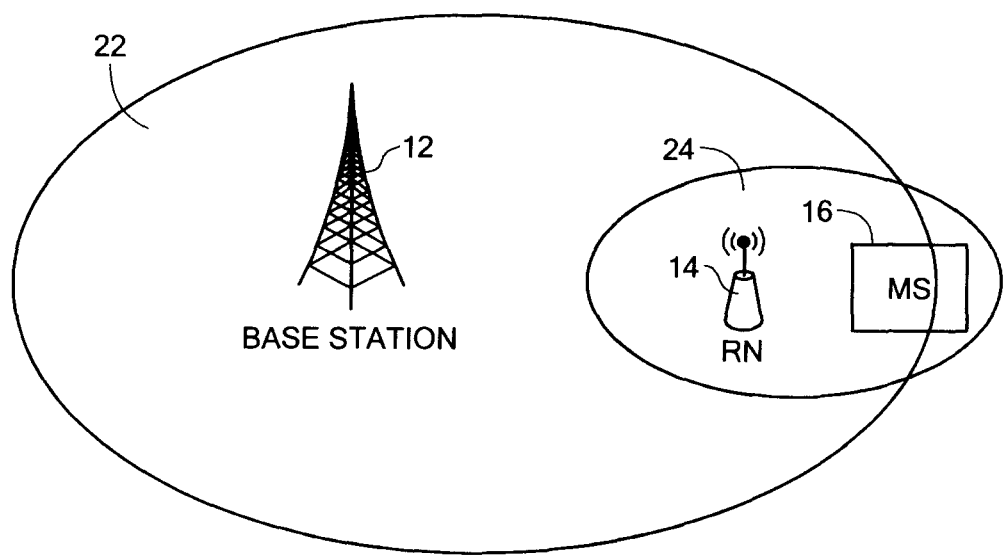
FIG. 4 is a block diagram of a third operational embodiment of the present invention.

A third operational embodiment is described with reference to FIG. 4. The embodiment shown in FIG. 4 is used to enhance throughput within a coverage region 22, i.e., cell. In this case, mobile station 16 at the edge of coverage region 22 is able decode broadcast control messages from base station 12. However, because mobile station 16 is at the edge of the coverage region 22, its capacity for communication with base station 12 is severely attenuated due to the low signal strength resulting from the distance from base station 12.

In this embodiment, as noted above, mobile station 16 receives broadcast control messages from base station 12. Relay node 14 relays only DL and UL unicast messages and traffic to/from mobile station 14. In this case, relay node 14 performs data scheduling and downlink re-fragmentation. Accordingly, as with the previous embodiment (FIG. 3), MAC control plane protocol is enhanced to provide a relay node MAC control plane enhancement ("R-MAC") to support this refragmentation.

With respect to the operation of mobile station 16, operation by mobile station 16 is not transparent because mobile station 16 may support the R-MAC control plane functions. In addition, a type interference control of relay node 14 is used so that communications to/from mobile station 16 can properly be supported.

Figure 5:
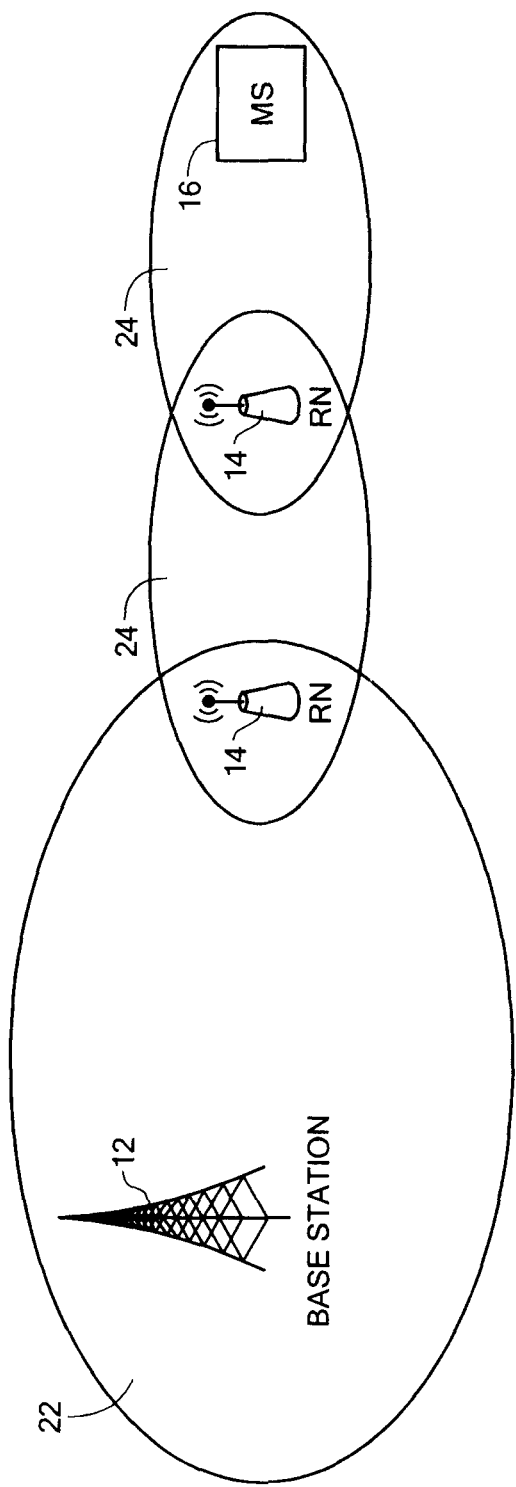
FIG. 5 is a block diagram of a fourth operational embodiment of the present invention.

The fourth operational embodiment is described with reference to FIG. 5. In the embodiment shown in FIG. 5, coverage is extended to mobile station 16 beyond the coverage area 22 of base station 12. Relay nodes 14 are arranged to have overlapping relay coverage nodes area 24. In this arrangement, relay nodes 14 include the full set of operational functions provided by a base station 12 plus the R-MAC layer. In addition, connection identification information for particular communication sessions as well as the implementation of the privacy functions are provided on an end-to-end basis, i.e. from mobile stations 16 to base station 12. Relay node 14 also supports local DL channel description ("DCD"), UL channel description ("UCD"), mobile neighboring advertisement ("MOB_NBR_AVD") messages, and the like. DCD messages provide downlink channel configuration information, such as power and timing adjustment rules. UCD messages include, for example, ranging code division information. MOB_NBR_AVD messages provide information relating to neighboring cells, HO information, etc. Relay node 14 also supports the information needed to route the mobile 16 station connection through the series of relay nodes 14 for communication with base station 12.

As with the previous two embodiments, the operation of mobile station 16 includes the new R-MAC layer. This embodiment also implements an independent data transmit and receive schedule. Further, in accordance with the present embodiment, interference control of relay nodes 14 is not significant because the mobile station 16 only communicates with a relay node 14 (as to compared to both a relay node 14 and base station 12 in some capacity or form).

Figure 6:
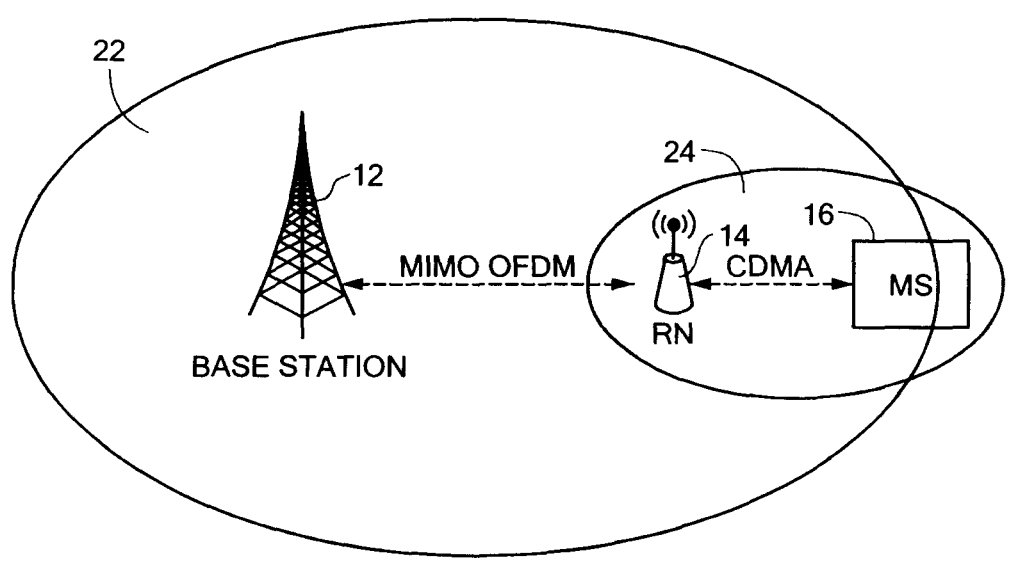
FIG. 6 is a block diagram of a fifth operational embodiment of the present invention.

A fifth exemplary operational scenario is described with reference to FIG. 6. The embodiment shown in FIG. 6 can be used to boost system capacity for a wireless communication transmission technology different than that supported by base station 12. For example, the embodiment shown in FIG. 6 shows code division multiple access ("CDMA") wireless communication between relay node 14 and mobile station 16 but uses multiple input, multiple output ("MIMO") OFDM wireless communication between base station 12 and relay node 14. Multiple Input, Multiple Output Orthogonal Frequency Division Multiplexing ("MIMO-OFDM") is an OFDM technology that uses multiple antennas to transmit and receive radio signals. MIMO-OFDM allows service providers to deploy wireless broadband systems that take advantage of the multi-path properties of environments using base station antennas that do not necessarily have line of sight communications with the mobile station.

MIMO systems use multiple antennas to simultaneously transmit data to the receiver, which processes the separate data transmissions. This process, called spatial multiplexing, can be used to proportionally boost the data-transmission speed by a factor equal to the number of transmitting antennas. In addition, since all data is transmitted both in the same frequency band and with separate spatial signatures, this technique utilizes spectrum very efficiently. The result is that CDMA system capacity is enhanced without actually impacting or requiring the upgrade of CDMA base stations and/or requiring the deployment of OFDM-based mobile stations 16.

Under the architecture shown in the embodiment of FIG. 6, cell-wise backhaul is provided. Using a technology such as MIMO-OFDM for communication between base station 12 and relay node 14 allows the benefit of MIMO-OFDM transmission to be maximized. It is contemplated that such an arrangement can be provided by implementing MIMO-OFDM and CDMA at the physical layer within relay node 14. As such, mobile station 16 and its use of CDMA is transparent to mobile station 16. In other words, the embodiment shown in FIG. 6 allows relay node 14 to act as a base station for the CDMA system. Although the embodiment shown in FIG. 6 shows CDMA and MIMO-OFDM technologies, the general proposition of the embodiment in FIG. 6 is that relay node 14 can provide an air interface translation function. In other words, the present invention is not limited solely to CDMA to MIMO-OFDM translation.

Of note, the operational embodiments shown in FIGS. 2-6 as well as other drawing figures herein showing relay node 14 are not limited solely to the use of a particular piece of hardware. It is contemplated that mobile stations themselves can serve as relay nodes within the context of the present invention provided that mobile stations 16 are equipped with the software to implement the relay node functions described herein. In other words, a mobile station can serve as a relay node 14 provided that it is equipped with software supporting relay node functions.

In accordance with the present invention, a number of functions are defined to support the aforementioned operational embodiments. These MAC layer control functions provide the ability for mobile station 16 to enter and operate within a relay-based network. These functions include ranging, initial network entry for mobile station 16 and defining a frame structure for wireless communication between and among mobile station 16, base station 12, and relay node 14. These functions also include the establishment of broadcast/unicast data/message transmission, and scheduling signaling. In addition, MAC layer control functions are provided for fast access point ("AP") switching, relay node-related MAC management messages and sleep/idle mode operation. Each of these functions are described herein.

Ranging

As an initial matter, it is noted that the implementation of the ranging function for the embodiments shown in FIGS. 2, 3, 5, and 6 are the same as is currently known in the art, e.g., the same as in the IEEE 802.16d and e standards. However, current standards do not provide or propose support for the operational embodiment shown FIG. 4 (system capacity enhancement through the use of relay nodes 14). A ranging design for that operational embodiment is described herein. In accordance with the present invention, there are two options for supporting ranging for the capacity enhancement embodiment (FIG. 4). As a first option, three types of ranging regions can be defined, resulting in shorter delay to establish ranging, but high complexity with respect to the relay node 14 ranging process. As a second option, two types of ranging regions can be defined, resulting in a long ranging establishment delay but low complexity with respect to the relay node 14 ranging process.

Regarding the first option, the three ranging regions include a common initial ranging region for the first step initial ranging of network entry or re-entry, a common AP switch ranging region and a private ranging region. For the common initial ranging region, all of the access points in the cell, i.e., the base station 12 and all relay nodes 14, monitor this region. The region may appear every N frames and is described in base station 12's UL-MAP. With respect to code set division, the code set is divided to enable mobile stations 16 to indicate the preferred access point. The code set for the common initial ranging region is divided among all access points in a cell. Mobile station 16 sends a code selected within the domain of the relay node 14 if the mobile station 16 selects a particular relay node 14 as its access point. The second type of ranging region within this first option is the establishment of a common access point switch ranging region. All of the access points in a cell monitor this region, and the region may appear ever N frames and is described in base station 12's UL-MAP. The code set is divided to enable base station 12 to ultimately indicate the access point, and each access point is allocated a code domain. To enable mobile 16 to use the dedicated code for the first step of AP switch ranging, the base station 12 or parent relay node 14 reserves a set of codes as temporary access point switch codes for intra-base station 12 access point switching. This arrangement speeds up the AP switching procedure. Mobile station 14 uses the temporary access point switch code on the common AP switch ranging region. Mobile station 14 uses the code selected within the domain of a selected relay node 14 between the common AP switch ranging region.

Finally, the private ranging region of the first option is described. In this region, each relay node and base station has its own private ranging region used for the second step of the initial ranging process and the second step of the AP switch ranging process. The second step means that after the first step of ranging process described above, the power and timing are aligned with the requirements of the access point. Private ranging region also allows for bandwidth request ranging and periodical ranging as well. The private ranging region is only monitored by relay nodes 14. With respect to code set division, relay node 14 reserves a code set for the second step ranging whether for AP switching or initial ranging. The remaining codes are divided as bandwidth request codes and periodic ranging codes. The length of the code may be shorter than those used for base stations 12, e.g., 74 versus 144 bits, since the interference within the region of a relay node 14 is less than compared with the base station because a smaller group of mobile stations 16 are supported by a relay node 14.

With respect to the second option, the common initial ranging and common AP switch regions are combined as a single region. Under this option, the access point will not be able to determine the purpose of the ranging, i.e. inter-base station access point switching or initial ranging based on the code. Accordingly, a MAC header is defined so that the access point can poll mobile station 16 to determine the purpose of the ranging. Under the second option, a private ranging region is also established and is the same as that described above with respect to the first option.

With respect to both option 1 and option 2, it is contemplated that the available codes, e.g., 250 different codes, are arranged in a block in which different groups of codes are assigned to the different domains. For example, with respect to the common initial ranging region described with respect to option 1, it is contemplated that the block of 250 codes can be divided so that there is a domain for base station 12, and a separate domain for each relay node 14 within the cell. With respect to the common switch ranging region for options 1 and 2, the block can be divided and a domain group reserved for intra-base station 12 switching and a separate group of codes assigned to establish domains for the various relay nodes within the group of common access points for inter-base station switching. Similarly, with respect to the private ranging region, the block of available codes can be divided into a second step ranging group domain, a periodic request domain, and a bandwidth request domain. Of note, with respect to the private ranging region, a shorter code length means a shorter ranging opportunity which means a smaller defined ranging region. Of note, for ranging purposes, the MAC header described above for option 2 can be added as an additional type in the feedback MAC header. The general concept of a feedback MAC header is known. However, the implementation of a ranging purpose function within that header is provided in accordance with the present invention.

Mobile Station Initial Network Entry

The present invention defines functions and procedures for allowing network entry of a mobile station 16 to a network having relay nodes 14. Initial network entry relates to the selection of codes, such as OFDMA codes, from the UL-MAP and DL-MAP by mobile station 16. Mobile station 16 selects a code base and tells base station 12 (or relay node 14) that mobile station 16 is going to join the network. In this case, base station 12 and/or relay node 14 monitor the ranging region, described above, to facilitate initial network entry of mobile station 16.

An exemplary arrangement for the operational embodiments shown in FIGS. 2 and 4 are described first. As an initial matter, it is presumed that all mobile stations 16 in this exemplary arrangement are able to decode broadcast control messages transmitted by base station 12. In these embodiments, mobile station 16 enters the network through base station 12. A common initial ranging region is dedicated for initial ranging, i.e., the common ranging region is used for the first step of initial ranging. The common ranging region is described in an uplink channel description ("UCD") and/or UL-MAP message. Base station 12 and all relay nodes 14 within the coverage region 22 monitor this ranging region constantly in order to speed up initial network entry. As discussed above, the available codes are divided among base station 12 and relay nodes 14 within the same coverage region 22, i.e., within the same cell. Base station 12 or relay node 14 is associated with the code set used by mobile station 16 to indicate its preferred access point in the first step of initial ranging. For example, these codes can be generated using the cell's uplink ID which can be a 7-bit field.

The method for selecting base station 12 is the same as is presently known in the art with respect to the initial network entry of a mobile station 16. Downlink channel description ("DCD") and UCD synchronization is performed by having mobile station 16 monitor DCD messages transmitted by base station 12. However, base station 12 adds information related to relay node 14 such as a preamble index, transmit region, etc., to the DCD message. Similarly, mobile station 16 monitors the UCD messages transmitted by base station 12. In this case, base station 12 adds relay information such as the code set corresponding to the relay node 14 for the first step of initial ranging, the ranging region, the number of hops (relay node 14 hops) to base station 12 as well an uplink relay identification number. Of note, the uplink ID for relay node 14 and the cell ID for the uplink are typically planned in advance and pre-assigned.

The operational embodiments shown in FIGS. 2 and 4 also involve the selection of an access point, e.g., base station 12 or relay node 14. In accordance with the present invention, mobile station 16 is arranged to detect relay preambles based on the general quantity measurement and number of hops. In accordance with the measurement and number of hops, the top 3 candidate access points are selected.

Mobile station 16 monitors the DL-MAP and UL-MAP to understand the common initial ranging region. Mobile station 16 selects a ranging code from the code set associated with the selected access point as was sent in the common initial ranging region. All relay nodes 14 and the base station 12 within coverage region 22 monitor the common initial ranging region and any relay node 14 which detected the code transmission informs base station 12 in the form of the received code index and signal strength. Base station 12 assigns a dedicated code for the second set of initial ranging as well time/power adjustment data. Base station 12 determines the access point for mobile station 16 based on (1) the code index received from mobile station 16, i.e., the intended access point from the perspective of mobile station 16, and (2) the load on the relay node 14 selected by mobile station 16.

The second step of initial ranging is done in connection with the selected relay node 14. In this case, base station 12 sends a ranging response message ("RNG-RSP") which (1) accepts the access point selected by mobile station 16 or suggests another access point, (2) assigns the CID, and (3) includes any timing/power adjustments that may be used by mobile station 16 to facilitate the ranging process. Mobile station 16 then starts to monitor the transmit region corresponding to the selected relay node 14.

The actual second step of initial ranging using the selected access point is the same as is known in the present art with the exception that the mobile station 16 has a dedicated code assigned for the second step of ranging after obtaining the relay transmit region. Of note, the above description of initial network entry for mobile station 16 with respect to the operational embodiment shown in FIGS. 2 and 4 includes a generalized discussion of the process flow and dynamics among mobile station 16, relay node 14 and base station 12. The process flow for initial network entry for mobile station 16 is described from the point of view of mobile station 16 in FIG. 7, from the point of view of relay node 14 in FIG. 8 and from the point of view of base station 12 in FIG. 9 for the operational embodiments shown in FIGS. 2 and 4.

Figure 7:
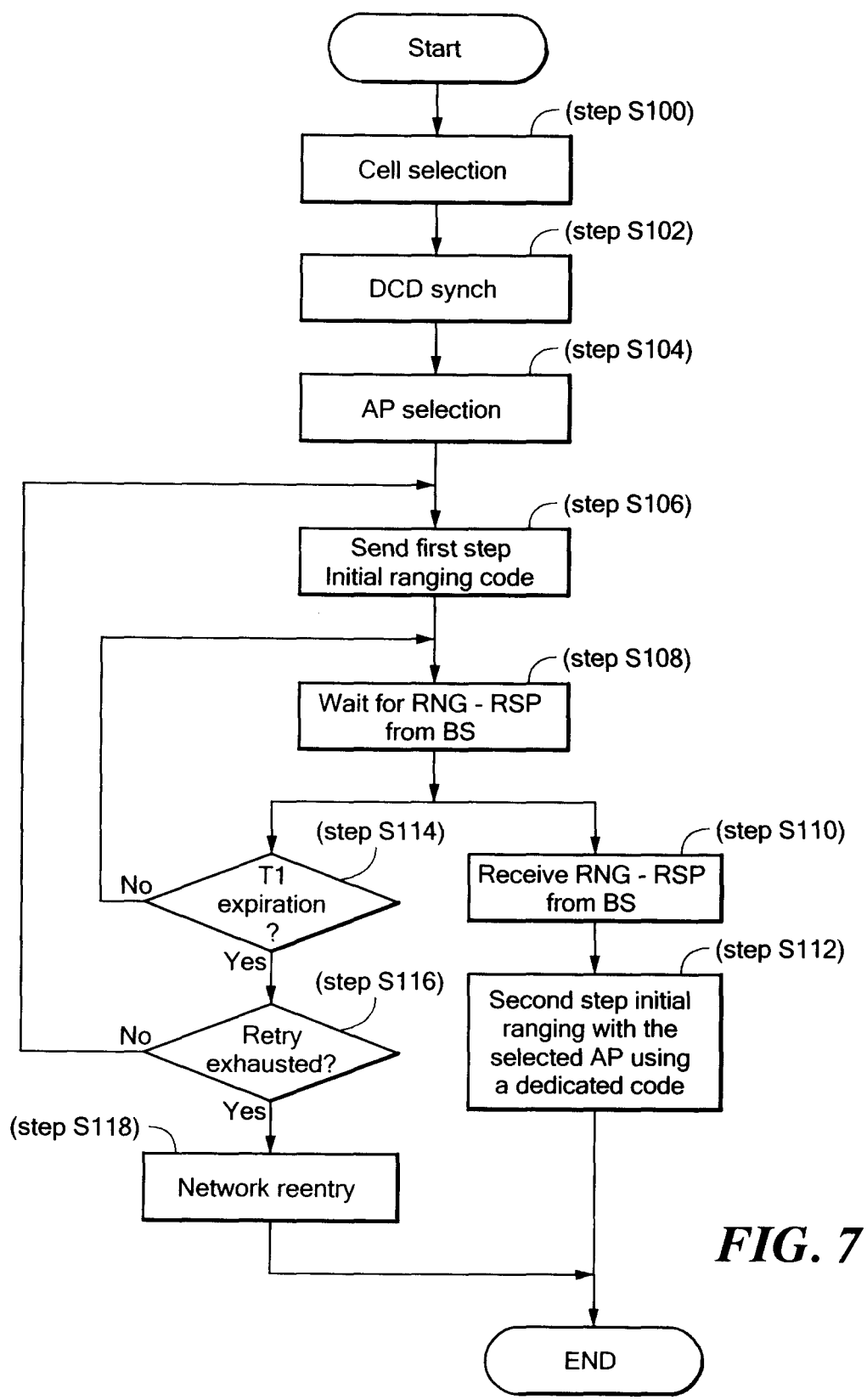
FIG. 7 is a flow chart of an initial network entry process for a mobile station described from the point of view of the mobile station in the operational embodiments shown in FIGS. 2 and 4.

Referring to FIG. 7, with respect to mobile station 16, mobile station 16 selects the cell, i.e. coverage region 22 it wishes to communicate within (Step S100). Mobile station 16 synchronizes the DCD message as described above (Step S102). The preferred access point is selected by mobile station 16 (Step S104) and transmitted to base station 12 and sends this as part of the first step initial ranging code (Step S106). Mobile station 16 then waits for the RNG-RSP from base station 12 (Step S108).

When mobile station 16 receives the RNG-RSP from base station 12 (Step S110), mobile station 16 engages in second step initial ranging with the selected access point using a dedicated code (Step 112). Recall that the RNG-RSP received from base station 12 includes the access point selected by base station 12.

If, during Step S108, the RNG-RSP is not received and a predetermined timer ("T1") expires (Step S114), the first step initial ranging code is re-sent a predetermined number of times until its retry quantity is exhausted (Step S116). Once the retry quantity is exhausted, mobile station 16 begins the network re-entry process again (Step S118).

Figure 8:
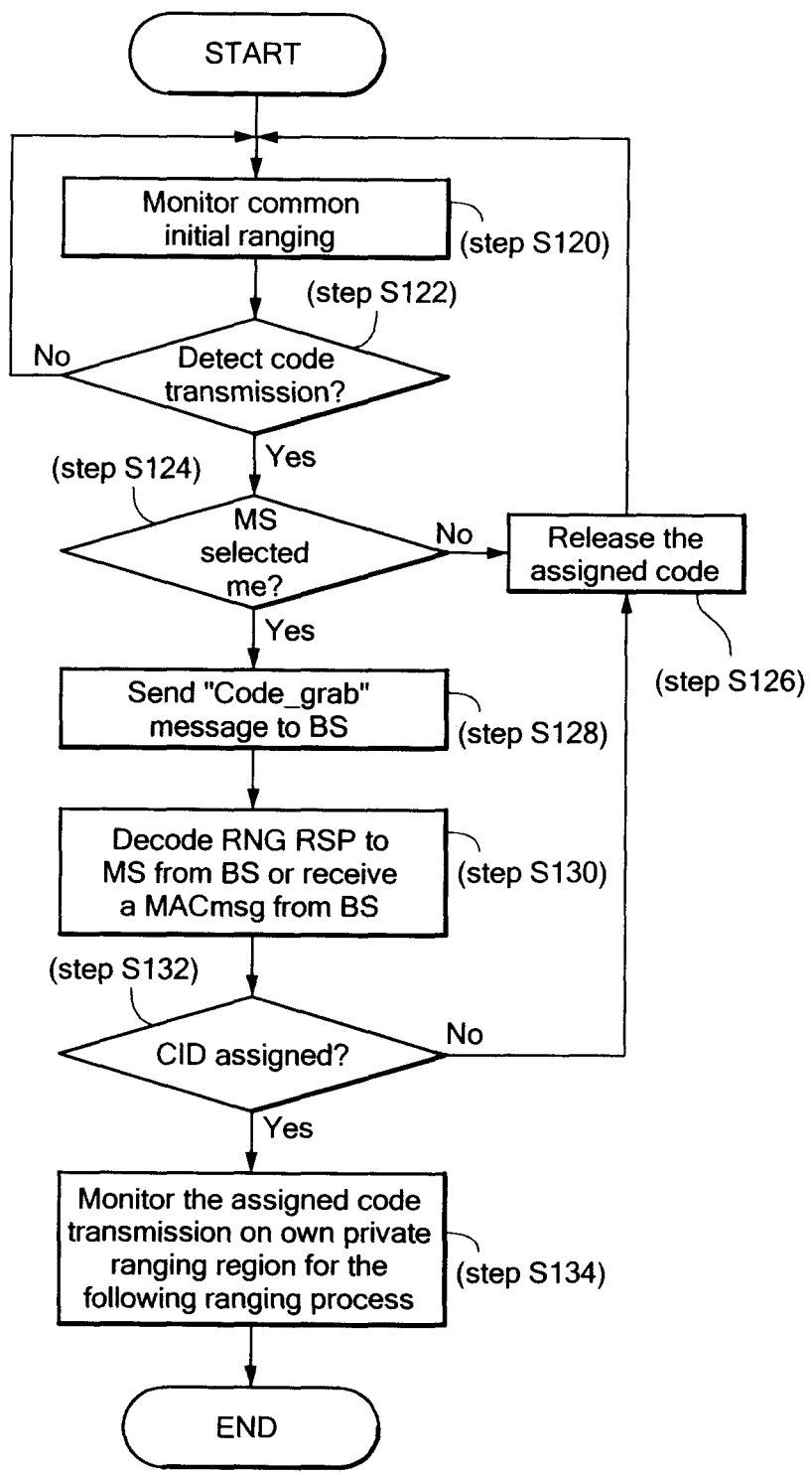
FIG. 8 is a flow chart of an initial network entry process for a mobile station described from the point of view of a relay node in the operational embodiments shown in FIGS. 2 and 4.

Turning now to FIG. 8, relay node 14 monitors the common initial ranging region (Step S120) until a code transmission is detected (Step S122). When a code transmission is detected, relay node 14 evaluates the code to determine whether mobile station 16 selected a code corresponding to that relay node 14 (Step S124). If the code transmission does not indicate that the particular relay node 14 has been selected, the assigned code is released by relay node 14 (S-126). If relay node 14 was selected, a "code_grab" message is sent to base station 12 (Step S128) indicating that the mobile station 16 selected the particular relay node 14. Relay node 14 decodes the RNG-RSP message sent from base station 12 to mobile station 16 (in other words, it detects the RNG-RSP message as well) or receives a separate MAC layer message from base station 12. Relay node 14 evaluates the message to determine whether a CID has been assigned to mobile station 16 (Step S132). If a CID has not been assigned, relay node 14 releases the assigned code. If a CID has been assigned, relay node 14 monitors the assigned code transmission on its own private ranging region for the subsequent ranging process, i.e. the second step initial ranging (Step S134).

Figure 9:
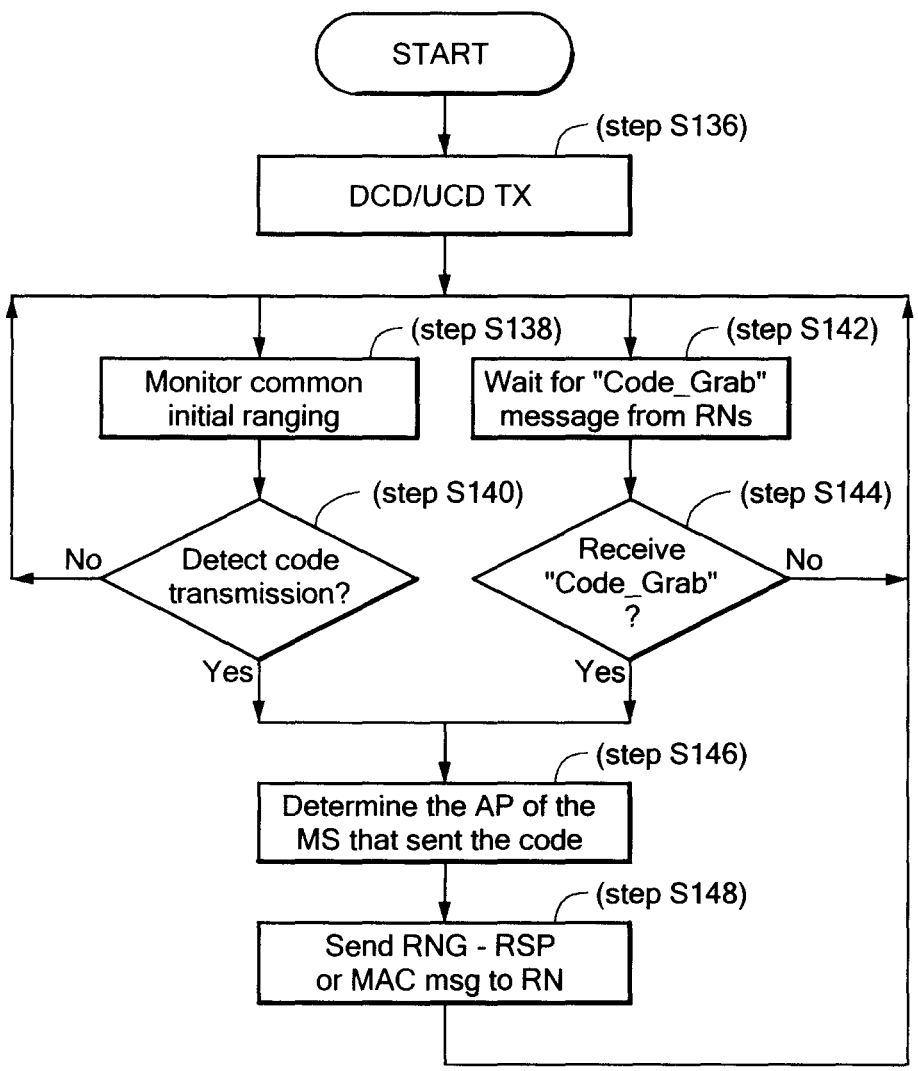
FIG. 9 is a flow chart of an initial network entry process for a mobile station described from the point of view of a base station in the operational embodiments shown in FIGS. 2 and 4.

Referring to FIG. 9, base station 12 initially transmits the DCD/UCD messages to be synchronized by mobile station 16 (Step S136). At this point, base station 12 monitors the common initial ranging region (Step S138) for the detection of a code transmission by mobile station 16 (Step S140). After Step S136, base station 12 also waits for the "code_grab" message from relay nodes 14 (Step S142). If a "code_grab" message has been received (Step S144) and base station 12 detects that a code has been transmitted (Step S140), base station 12 evaluates the transmission and "code_grab" message to determine the access code corresponding to mobile station 16 that transmitted the code to base station 12. Base station 12 then sends the above-described RNG-RSP or other MAC control layer to the relay node 14 (Step S148).

Also consider the example where there are two relay nodes 14, namely relay A and relay B. In terms of signaling exchange, base station 12 transmits the DCD (in its coverage region 22), UCD, DL-MAP, UL-MAP to mobile station 16. Now, consider that mobile station 16 selects relay B. Mobile station 16 transmits the code corresponding to relay B on the common initial ranging region. This code is received by relay A, relay B and base station 12. Relay B then transmits a "code_grab" message which is received by base station 12. Base station 12 transmits the RNG-RSP message to mobile station 16. Relay B then transmits its DL-MAP and UL-MAP for relay B. Mobile station 16 transmits the ranging code assigned by relay B and relay B then transmits a RNG-RSP message, adjusting power and time alignment.

The previous description was, as noted, for the operational embodiments shown in FIGS. 2 and 4. The initial network entry process for the operational embodiment shown in FIGS. 3 and 5 is now described. In these operational embodiments, mobile station 16 enters the network through a relay node 14. This process can be the same as is currently known, with the exception that mobile station 16 detects the selected relay nodes 14 transmit region by detecting forward channel information at the physical layer. Access point selection for these operational embodiments is known, and is the same as current design-preamble detection with the addition that the relay node 14 preamble is defined. In accordance with the operational embodiment shown in FIGS. 3 and 5, mobile station 16 searches for an R-MAP (MAP corresponding to the relay node 14) through the relay forward channel at the physical layer ("R-FCH"). As with the previously described operational embodiment initial network entry process, mobile station 16 synchronizes DCD and UCD by monitoring DCD from the relay node 14. Of note, although mention is made that the initial network entry process for the operational embodiments in FIGS. 3 and 5 is similar to that currently known, it is contemplated that the present invention is not so limited and that variations can be supported as the current standards are further developed.

Frame Structures

In accordance with the present invention, logical frame structures are defined and implemented in various scenarios to establish the extent to which a mobile station 16 can wirelessly communicate with base station 12 or the extent to which mobile station 16 wirelessly communicates via relay node 14. In each case, the logical frame structure that is implemented to communicate using relay node 14 is divided into a base station downlink sub-frame and a base station uplink sub-frame in terms of timing. In certain embodiments, the DL sub-frame and the UL sub-frame allocate a portion of the sub-frame for communication with relay node 14.

In the first scenario, all mobile stations 16 within coverage region 22 can receive transmissions from base station 12. This arrangement involves base station 12 allocating a burst in the UL sub-frame to enable relay node 14 to unicast uplink traffic and to indicate to base station 12 the detection of ranging code transmission. In other words, in this scenario, the base station DL sub-frame is unchanged from that currently used with the exception that the control message transmitted by the base station in the DL sub-frame is received by mobile station 16 and relay node 14. However, unlike currently proposed standards, a portion of the base station 12 UL sub-frame is dedicated to allowing relay node 14 to transmit to base station 12 based on the burst allocated in the UL-MAP. In other words, there is a mobile station 16 unicast message/traffic/ranging indicating component of the base station UL sub-frame transmitted by relay node 14 and received by base station 12 and mobile station 16.

In the second scenario, some mobile stations 16 within coverage area 22 cannot receive traffic from the corresponding base station 12. In this arrangement, R-FCH is used to indicate the burst location and physical parameters of the R-MAP. R-MAP is used for relay node 14 resource allocation signaling and includes information elements ("IE") supplying the same. The frame structure for this scenario includes a preamble used for mobile station 16 access to relay node 14. Of note, the frame structures described herein are with respect to and from the point of view of relay node 14.

In this scenario, the base station DL sub-frame, in addition to the preamble and DL-MAP and UL-MAP, includes a portion in which relay node 14 transmits a broadcast control message, unicast message and/or traffic that is received by mobile station 16. This carved out portion of the base station DL sub-frame also includes the above-described R-MAP. In the base station UL sub-frame portion of the frame, that is received by relay node 14 from mobile stations 14, there is a portion used for initial ranging that includes information elements from the R-MAP. In addition, the base station UL sub-frame includes a portion transmitted by relay node 14 to base station 12 based on the burst allocated in the UL-MAP. In other words, the base station UL sub-frame includes a portion which is used by mobile stations 16 to transmit to relay node 14 and a portion used by relay nodes 14 to transmit to base stations 12.

Figure 10:
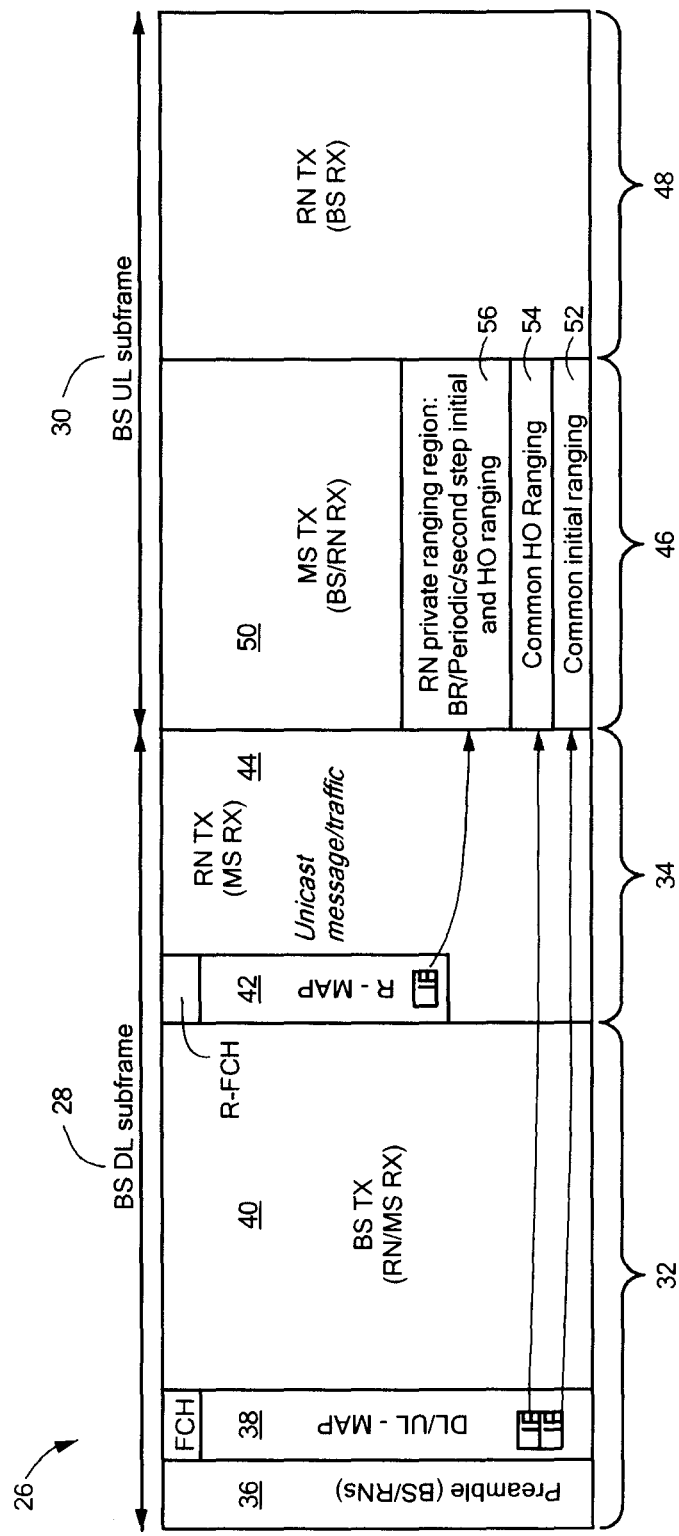
FIG. 10 is a diagram of an exemplary logical frame structure constructed in accordance with the principles of the present invention.

In the third scenario, all mobile stations 16 within coverage area 22 can receive from base station 12. However, unlike scenario one described above, the third scenario provides for handoff and includes a common initial ranging region and common handoff ("HO") ranging region. This scenario is described with reference to the logical frame structure shown in FIG. 10. Frame 26 includes base station DL sub-frame 28 and base station UL sub-frame 30. Base station sub-frame 28 includes relay node receive portion 32 and relay node transmit portion 34. Relay node receive portion 32 is received from base station 12 and relay node transmit portion 34 is transmitted to mobile stations 16 within the cover zone 24 of relay node 14. Relay node receive portion 32 itself is further divided into preamble for base stations 12 and relay nodes 14 in the form of preamble 36. Of note, preamble 36 can include the same or different preambles corresponding to base station 12 and relay nodes 14. DL-MAP and UL-MAP portion 38 of relay node receive portion 32 include information elements corresponding to a common handoff ("HO") ranging and common initial ranging codes. Finally, relay node receive portion 32 includes a base station transmit section 40 which includes traffic, control and messaging information transmitted by base station 12 and is received by relay nodes 14 and mobile stations 16.

Relay node transmit portion 34 is received by mobile stations 14 within relay node coverage zone 24 and includes R-MAP 42 and unicast message/traffic section 44. R-MAP 42 includes information elements which are used to indicate the relay node private ranging region.

Base station UL sub-frame 30 includes relay node receive portion 46 and relay node transmit portion 48. However, unlike the base station downlink sub-frame, relay node receive portion 46 is received by relay nodes 14 from mobile stations 16 and relay node transmit portion 48 is transmitted to base station 12 based on the burst allocated in the UL-MAP. Relay node receive portion 46 includes uplink mobile station transmit portion 50 which is received by relay node 14 and base station 12 that includes traffic, and other message information. Relay node receive portion 46 also includes common initial ranging region 52, common HO ranging region 54 and receive node private ranging region 56. Common initial ranging region 52 is, as discussed above, used by mobile station 16 for first step initial ranging in which base station 12 controls the resource allocation for the initial ranging region. Common HO ranging region 54 is used for the first step access point switch ranging in which the base station 12 controls the resource allocation for the AP switch ranging region. Relay node private ranging region 56 is used for mobile station 16 ranging to relay node 14 in which relay node 14 controls the resource allocation for dedicated ranging region for the mobile station 16. Of note, R-FCH is used to indicate the burst location and physical parameters of the R-MAP.

In the fourth scenario, not all mobile stations within a coverage area 22 can receive from base station 12 and some relay nodes 14 likewise cannot receive from base station 12. The resulting frame structure is for a first hop relay in which other relays rely on the first hop relay node 14 for access to base station 12. This scenario is similar to the second scenario described above. However, in this scenario, the base station DL sub-frame relay node receive portion includes downlink base station transmit data that is received by the first hop relay node 14 and mobile stations 16. Further, the downlink relay node portion of the DL sub-frame is transmitted to other second hop relay nodes 14 in addition to mobile stations 16.

On the base station UL sub-frame portion of the overall frame, the initial ranging region is received from mobile station 16 and other second and higher hop relay nodes 14.

Data/Message Transmission and Scheduling Signaling

The present invention provides MAC control plane arrangements for broadcast control message transmission. In accordance therewith, it is contemplated that the present invention supports global broadcast control messages from the perspective of base station 12. As noted above, these broadcast control messages include the DL-MAP and UL-MAP, DCD and UCD messages as well as any other messages that can be broadcast by base station 12. In general, relay node 14 relays global broadcast messages originally transmitted by base station 12 if there is at least one mobile station 16 which has entered the network through that same relay node 14 and also indicates its intention of needing relay node 14 to relay the global broadcast control messages. This intention can be made by mobile station 16 transmitting a control plane message to relay node 14. In addition, relay node 14 can relay global broadcast messages if the relay node 14 has sufficient resources to do so, e.g., it can do so without causing additional channel interference.

It is also contemplated that relay node 14 can itself broadcast local broadcast control messages. Such can be accomplished by a message which includes a relay node 14 local burst profile as well as a channel that has been defined for such relay node 14 local broadcast control. Such local broadcast control messages can also include a local neighborhood advertisement by relay node 14 if at least one mobile station 16 needs the global control message relayed. In other words, local broadcast control messages can be used by relay node 14 to relay global broadcast control messages transmitted by base station 12.

Figure 11:
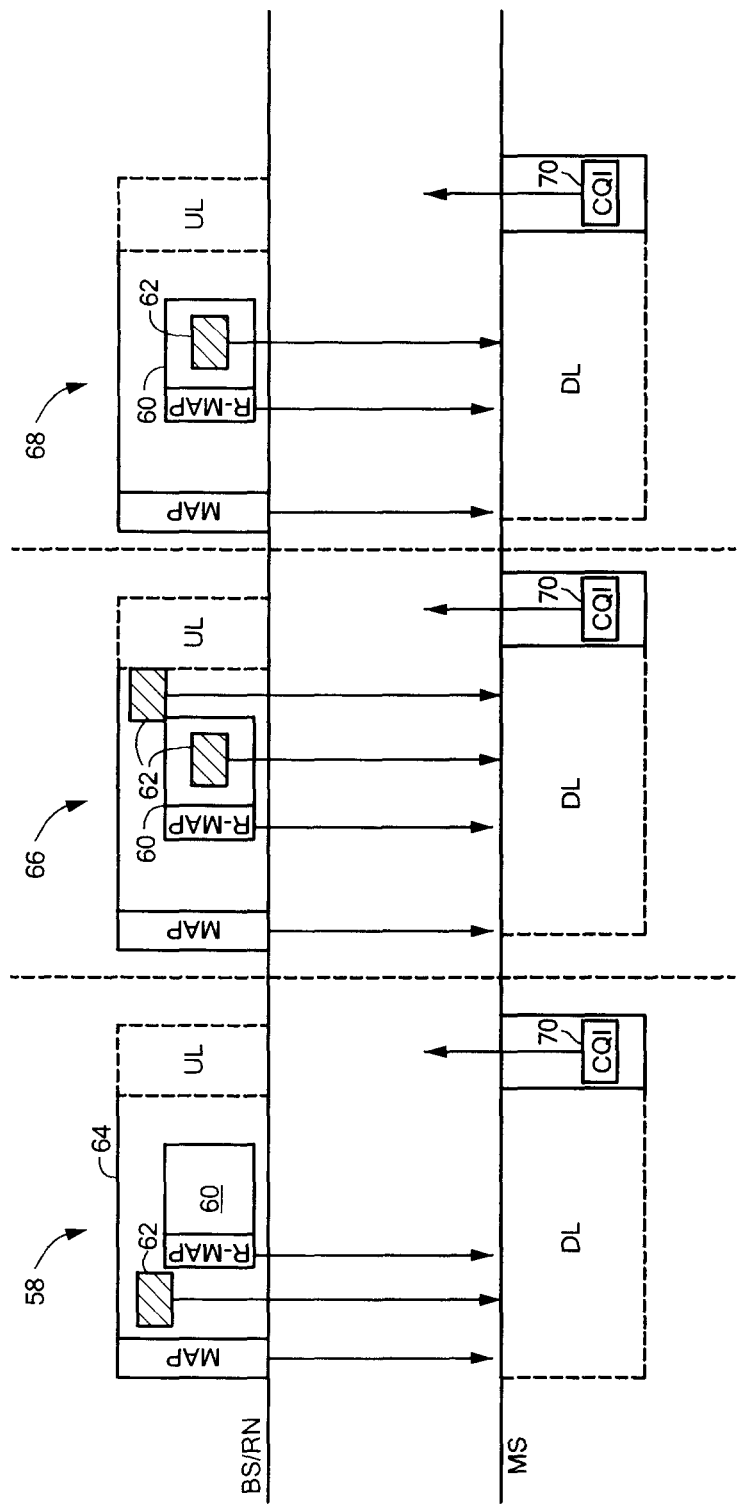
FIG. 11 is a diagram with examples of downlink traffic transmission arrangements.

Downlink traffic transmission is explained to FIG. 11. FIG. 11 shows three examples of downlink traffic transmission block diagrams. With respect to downlink resource allocation signaling, both base station 12 and relay nodes 14 use a MAP to transmit data scheduling signaling. In addition, relay nodes 14 broadcast their own scheduling information through their own MAP, defined and described herein as R-MAP. Relay nodes 14 receive data from their corresponding parent nodes, whether base station 12, or, in the case of multi-hop relay nodes, another relay node 14. Mobile stations 12 are permitted to receive downlink data from a relay node 14 and base station 12 if possible, based for example, on the difference in signal strength between relay node 14 and base station 12 being larger than a predetermined amount. It is contemplated that the routing table can be a CID-based design as is known in the art.

Channel quality indication ("CQI") feedback is also contemplated. CQI is used by relay nodes 14 and base stations 12 based on feedback received from mobile station 16 to establish channel parameters such as power level, etc. In this case, mobile station 16 feeds back the CQI corresponding to relay node 14 in a time division multiple access ("TDMA") or CDMA fashion to its access point. The access point may relay the CQI of further up the signal chain, i.e. to base station 12 and relay nodes 14 closer to the base station 12.

Referring to FIG. 11, downlink traffic transmission arrangement 58 includes relay node burst 60. In the case of arrangement 58, data burst 62 is transmitted by base station 12 (it is shown in downlink frame 64 outside of the relay node burst 60 area). Download traffic transmission arrangement 66 shows a frame structure in which a data burst 62 is transmitted by base station 12 and a data burst 62 is transmitted by relay node 14 within relay burst 60. Finally, arrangement 68 shows data burst 62 transmitted on the uplink by relay node 14 as part of the relay node burst 60. In sum, downlink traffic transmission and the corresponding data burst 62 can be done by one or both of base station 12 and relay node 14. Of note, each of arrangements 58, 66 and 68 shows CQI 70 transmitted by mobile station 14 on the uplink portion of the frame.

Uplink traffic transmission uses UL resource allocation signaling in which both base stations 12 and relay node 14 use a MAP, previously described, to transmit allocation signaling. UL unicast traffic from mobile station 16 is monitored by its access point. Further, UL traffic from relay node 14 (to base station 12 or another relay node 14) is monitored by that parent access point. It is contemplated that a control plane message can be used by relay node 14 and sent to mobile station 16 to inform mobile station 16 of uplink resource assignments.

Fast Access Point Switching

Fast access point ("AP") switching is used to minimize handoff delay as a mobile station 16 switches from access point to access point, i.e. from relay node 14 to another relay node 14, corresponding to the same or different base stations 12. A macro diversity set is established by mobile station 16 based on measurements, e.g., general quality measurements, taken by mobile station 16. Mobile station 16 establishes the members as potential handoff candidates. Members in the macro diversity set share information regarding switching. The arrangements described herein are suitable for all operational embodiments described above. The macro diversity set includes multiple nodes, e.g., relay nodes 14 and/or base stations 12. In order to conserve resources, a predetermined maximum can be established. For example, an upper limit of 8 can be established as the maximum number of members in the macro diversity set. Of course, it is contemplated that the present invention is not limited to 8, and any number can be used subject to the processing and storage capabilities of base station 12, relay node 14 and mobile station 16 within system 10.

Regarding the macro diversity set, DL data is multicast at the base station 12 level, and not the relay node 14 level. For example, if all members are covered by two base stations 12, downlink data is multicast only from those two base stations 12. It is contemplated that the macro diversity set creation and update processes can be the same as is currently employed in a mobile station and base station environment, subject to further enhancement as may occur in the art.

Figure 12:
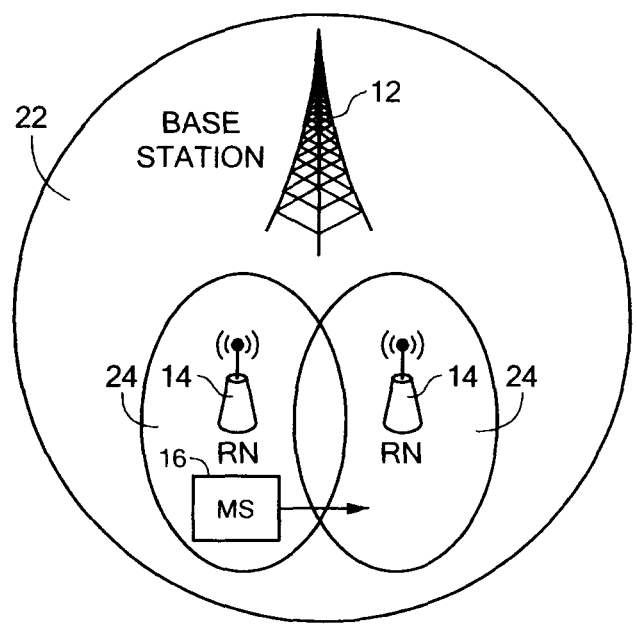
FIG. 12 is a block diagram of a macro diversity intra-base station switching arrangement constructed in accordance with the principles of the present invention.

The first example is shown in FIG. 12 in which mobile station 16 is moving from a relay node coverage area 24 supported by a first relay node 14 into a second relay node coverage area 24 corresponding to a second relay node 14 within a single coverage region 22 supported by base station 12. This example is suitable for all operational embodiments described above even though FIG. 12 generally depicts the capacity enhancement example shown in FIG. 4.

In this first example, inter-relay node hand off ranging is a deterministic event. Each relay node 14 and the base station 12 reserve a predetermined quantity of handoff codes within the code set for intra-base station, e.g., handoff between relay nodes 14 within the coverage region 22 for a base station 12. Although certainly not an absolute limitation, an exemplary limitation would reserve less than 3 handoff codes within the code set for intra base station handoff.

A temporary handoff code assigned by the first relay node is assigned to identify a mobile station 14 during handoff ranging to the second (target) relay node. The result is a short delay and a random handoff procedure is fully avoided. In accordance with this first example, it is not necessary to send an RNG-REQ, thereby resulting in lower overhead because the mobile station 14 is identified by the handoff code itself. In addition, no association is needed. Association refers to monitoring the target AP and communicating with the target AP even though mobile station 16 is still logically associated with the first AP. It is estimated that handoff duration can be accomplished within three to four frames using this example. As such, this first example is suitable for handoff by a mobile station 16 from base station 12 to relay node 14, from a first relay node 14 to a second relay 14, and from a relay node 14 to a base station 12. Further, it is contemplated that this first example is suitable to facilitate handoff from a relay node 14 to a second relay node 14 corresponding to a same parent relay node 14, from parent relay node to child relay node 14 and vice versa. As used herein, parent relay node 14 refers to a relay node that is closer in number of hops to base station 12.

Figure 13:
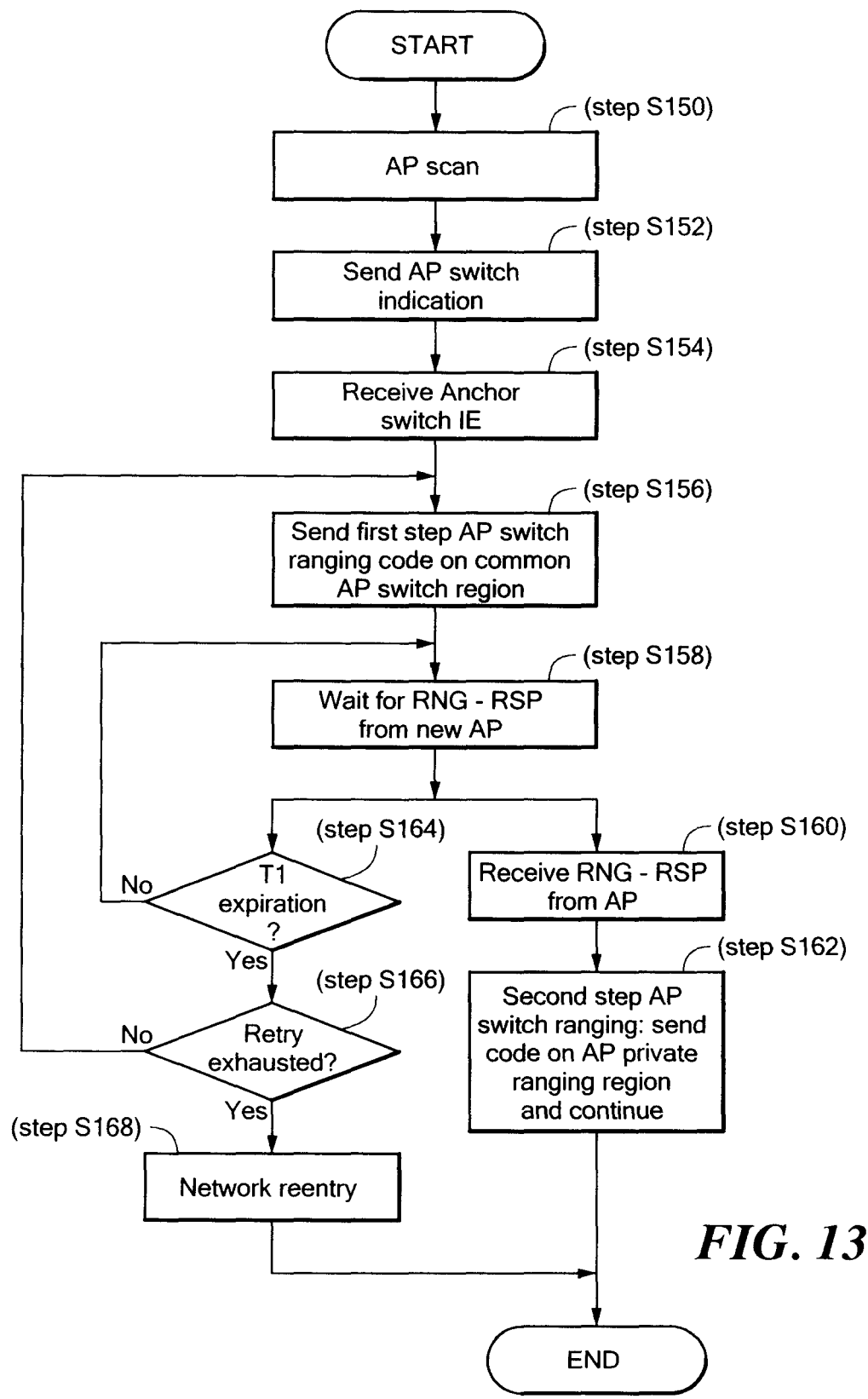
FIG. 13 is a flow chart of an intra-base station switching process from the perspective of a mobile station.

The intra-base station switching process is described with reference to FIGS. 13-15 in which FIG. 13 describes the switching from the perspective of mobile station 16, FIG. 14 describes the intra base station switching from the perspective of the target (second) relay node 14, and FIG. 15 describes the switching process from the perspective of base station 12. Referring first to FIG. 13, mobile station scans for potential access points to create a macro diversity set (Step S150). Mobile station 16 sends the indication of its desired access point switch to its anchor node, i.e., the current relay node 14 or base station 12 serving mobile station 16 (Step S152). Mobile station 16 receives the anchor switch information element (Step S154) and sends the first step AP switch ranging code on the common AP ranging region (Step S156). Mobile station 16 then waits for the RNG-RSP from the new AP (Step S158). If the RNG-RSP is received from the new access point (Step S160), then mobile station 16 performs second step access point switch ranging, i.e., sending the code on the access point's private ranging region and continues with operation (Step S162). Steps S164, S166 and S168 are the same as those described above with respect to Steps S114, S116 and S118 in FIG. 7 in the case where the RNG-RSP message is not received from the new access point.

Figure 14:
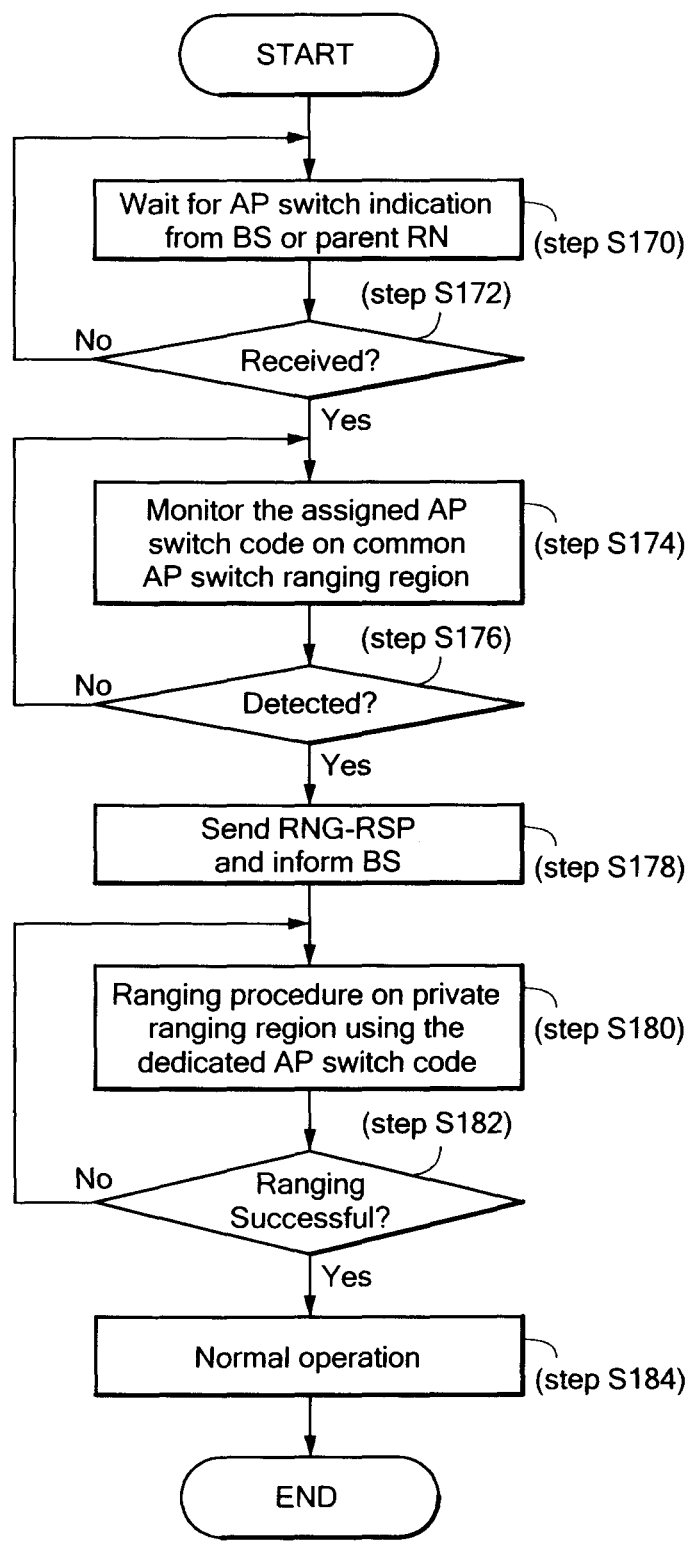
FIG. 14 is a flow chart of an intra-base station switching process from the perspective of a relay node.

With respect to the target relay node 14, as is shown in FIG. 14, target relay node 14 waits for the AP switch indication from base station 12 or its parent relay node 14 (Step S170). If and when the switch indication is received (Step S172), the target access point monitors the assigned access point switch code on the common AP switch ranging region (Step S174). When it detects its switch code (Step S176), the target relay node 14 sends an RNG-RSP message to mobile station 16 and informs base station 12 that it has done so (Step S178). Target relay node 14 then performs the ranging procedure on the private ranging region using the access point switch code dedicated to it (Step 180). If ranging is not successful, target relay node 14 again performs Step S180. If ranging is successful, target relay node 14 performs normal operation with respect to communications with other relay nodes 14, mobile station 16 and base station 12 (Step S184).

Figure 15:
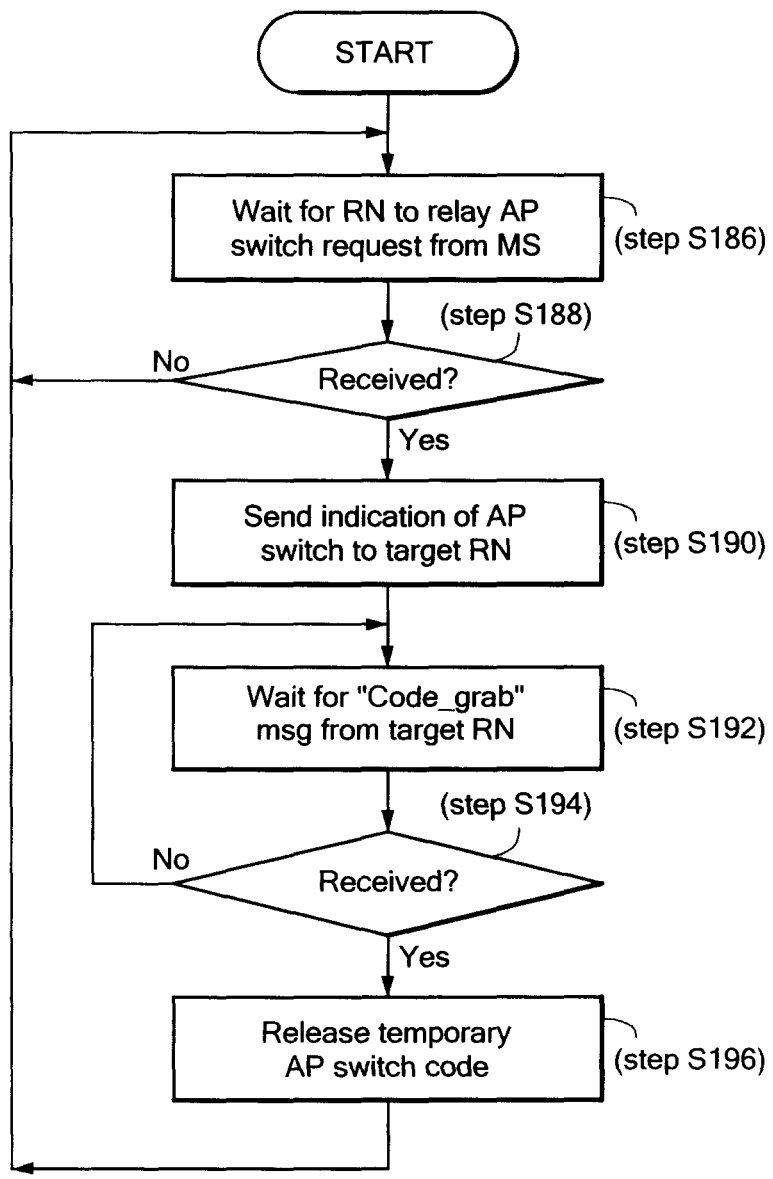
FIG. 15 is a flow chart of an intra-base station switching process from the perspective of a base station.

Referring to FIG. 15, from the perspective of base station 12, base station 12 waits for relay node 14 to relay the access point switch request received from mobile station 16 (Step S186). This is the case for those scenarios where mobile station 16 is not able to communicate with base station 12. When the access point switch request is received by base station 12 (Step S188), base station 12 sends an indication of the access point switch to the target relay node 14 (Step S190). Base station 12 waits for "code_grab" message from the target relay node 14 (Step S190). When the "code_grab" message is received (Step S194), base station 12 releases the access point switch code temporarily assigned to the target relay node 16 so it can be re-used (Step 196).

Figure 16:
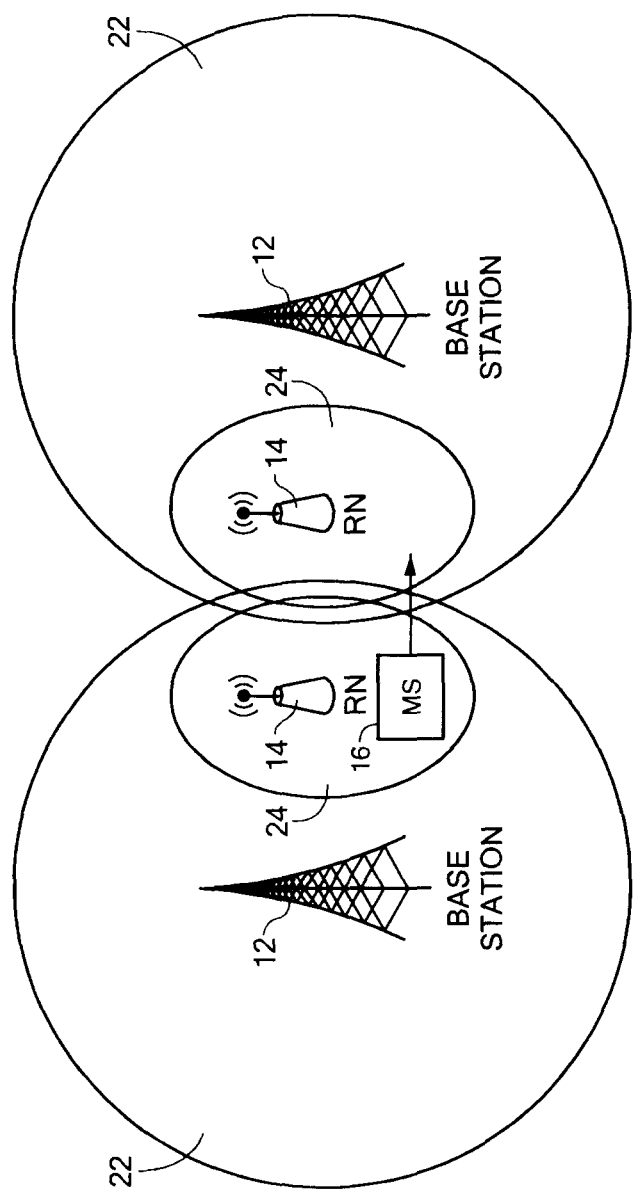
FIG. 16 is a block diagram of a macro diversity inter-base station switching arrangement constructed in accordance with the principles of the present invention.

The second example of access point switching is inter-base station switching. Under this example, inter-base station switching is equivalent to inter-parent relay node switching. The arrangement shown in FIG. 16 is an exemplary diagram of inter-base station switching, it being understood that relay nodes 14 can take the place of base stations 12 in FIG. 16. This example, like the previous example, is suitable for all operational embodiments described above with respect to FIGS. 2-6. Referring to FIG. 16, inter-base station handoff is generally considered a random event if there was no inter-base station communication. Such is the case because mobile station 16 is moving from a region supported by one base station 12 into another base station 12 region. Mobile station 16 uses a handoff code selected from a code set associated with the selected target base station 12 (or relay node 14) for the first step handoff ranging on a common handoff ranging region. The target relay node 14 can then assign a dedicated handoff code for the mobile station 16 so that mobile station 16 can perform second step ranging in the target relay nodes ranging region. The remainder of the handoff procedure is known in the art and is not described herein.

Figure 17:
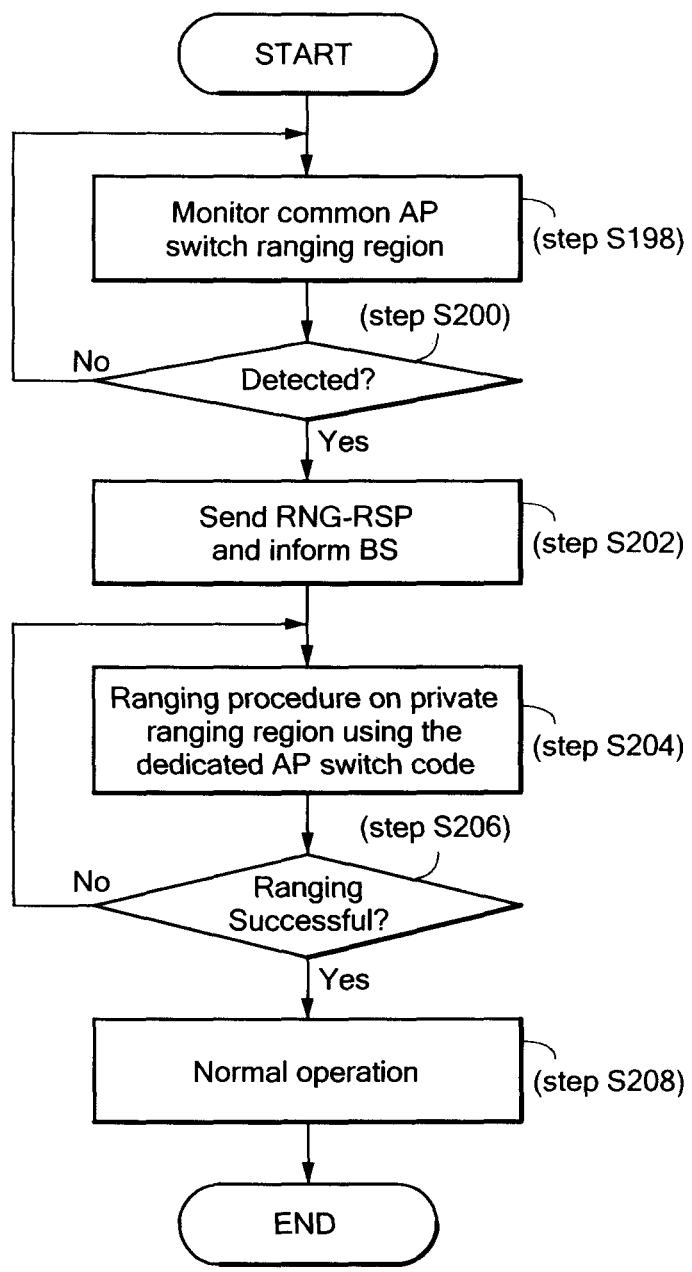
FIG. 17 is a flow chart of an inter-base station switching process from the perspective of a relay node.

Inter-base station switching processes from the perspective of the target relay node 14 and base station 12 are described with reference to FIGS. 17 and 18, respectively. The operation for inter-base station switching is the same as for intra-base station switching described above with respect to FIG. 13. Referring to FIG. 17, target relay node 14 monitors the common access point switch ranging region (Step S198). When it detects its code transmission (Step 200), it sends an RNG-RSP message to mobile station 16 and informs its corresponding base station 12 (Step S202). Target relay node 14 then performs a ranging procedure on the private ranging region using its dedicated AP switch code (Step S204). The ranging procedure continues until mobile station 16 has successfully completed power and time alignment, i.e., the range of procedure is successful (Step S206) at which point target relay node 14 engages in normal operation with respect to the mobile station 16 and base station 12 (Step S208).

Figure 18:
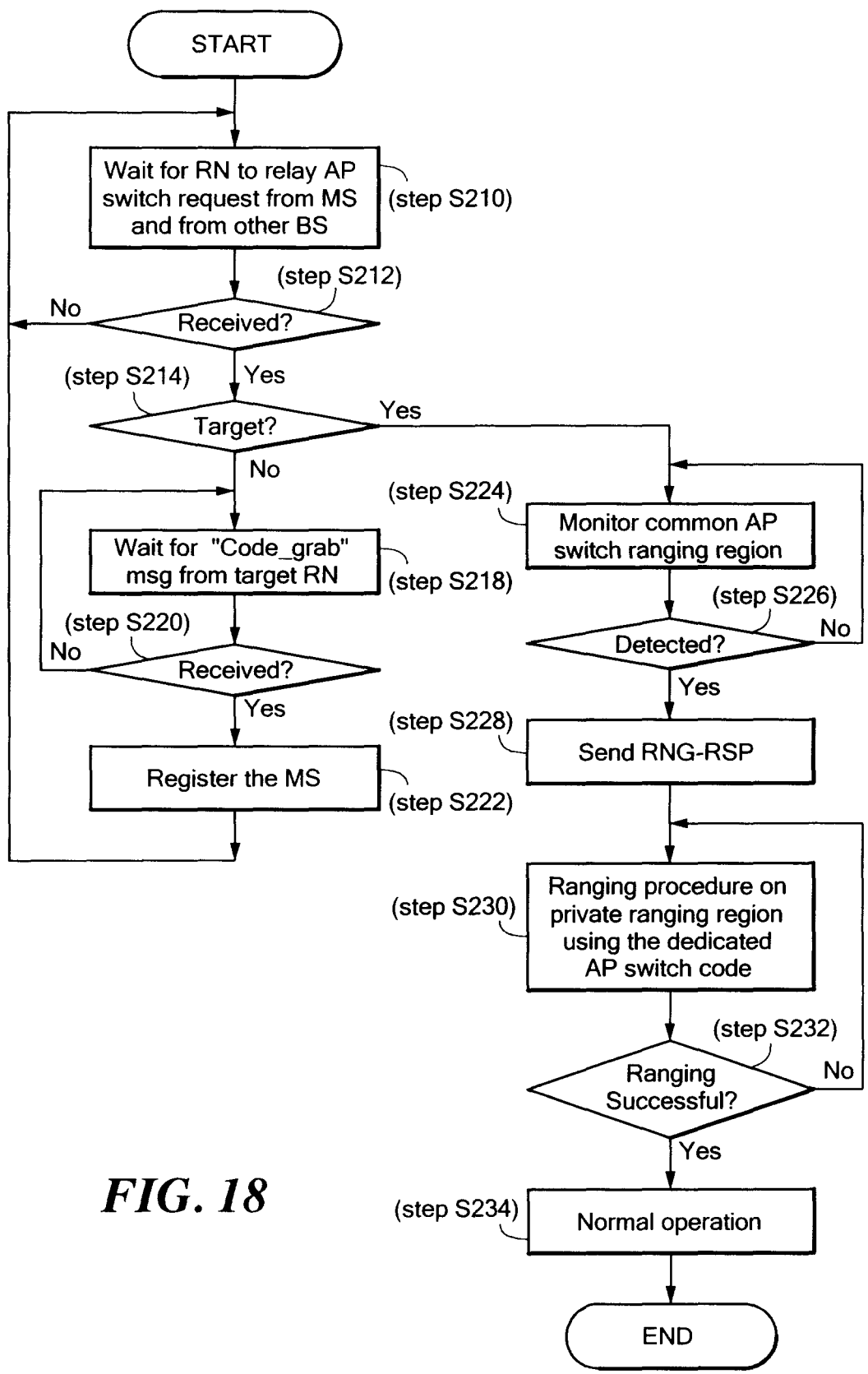
FIG. 18 is a flow chart of an inter-base station switching process from the perspective of a base station.

Referring to FIG. 18, the process flow for target base station 12 is described. Initially, base station 12 waits for target relay node 14 to relay the access point switch request from mobile station 16 (Step S210). When the switch request is received (Step S212) base station 12 determines whether it is the target of the handoff (Step S214). In other words, base station 12 determines whether it is the target access point. If base station 12 is not the target, thereby implying that a relay node 14 within its coverage region 22 is the target, base station 12 sends an indication to the target relay node 14 that the target relay node is the access point switch (Step S216). The target relay node 14 is also allocated a temporary switch access point switch code by base station 12. Base station 12 waits to receive the "code_grab" message from the target relay node 14 (Step S218). When the "code_grab" message is received (Step S220), base station 12 releases the temporary access point switch code so it can be re-used (Step S222).

If base station 12 is the target access point (Step S214), it monitors the common access point switch ranging region (Step S224). When base station 12 detects the first step access point switch ranging code (Step S226), it sends an RNG-RSP message, assigning a dedicated AP switch code to mobile station 16 (Step S228). Steps S230, S232 and S234 correspond to Steps 204, 206, and 208 on FIG. 17 regarding the private ranging procedure and the commencement of normal operation.

Flow control at the MAC control plane level is used to control multicast data transmitted from base station 12 to relay nodes 14 and base stations 12 to base station 12 (such as is used in handoff operation) to preserve communication channel resources. Flow control is implemented in accordance with the principles of the present invention between base stations 12 to facilitate smooth switching. Toward that end, relay nodes 14 maintain an upper bound for a communication data rate for each served mobile station 16 within relay node coverage area 24 of corresponding relay node 14. This upper data rate bound can be set based on an average data rate for handover action time. Handover action time refers to the duration between the time mobile station 16 sends a handoff indication to the time mobile station 16 starts to monitor the new access point.

Flow control at the MAC control plane layer involves information exchange between base station 12 and relay node 14 or between parent relay node 14 and its child relay node 14. In such cases, relay node 14 informs base station 12 or parent relay node of the average data rate. This can be in an absolute value. Relay node 14 can also include a stop command after receiving mobile station's 16 handover indication or the boundary of a data buffer is reached. A start command can be sent once buffer room is available. Relay node 14 can also transmit the average data rate change to inform the parent relay node or base station 12 to increase or decrease data transmission rate. This can be done based on buffer capacity.

It is also contemplated that base station 12 can control the downlink data for transmission rate to the mobile station 16 from a relay node 14 to minimize radio resource waste and to ensure that data week transmission is not necessary based on post-switch continuity.

MAC Control Plane Management Messages

In accordance with the present invention, a number of different type of MAC control layer management messages are provided to support wireless relay node communications. These messages include configuration, traffic scheduling, flow control, mobile station network entry, AP switching messages and a security key management message if relay node 14 implements a privacy, i.e. security, sub layer.

Regarding configuration, an "R-CD" message is provided for use in both the uplink and downlink directions between the relay node 14 and mobile station 16. The R-CD message includes the identification of the relay node 14 ("R-ID"), the downlink channel ID, configuration change count, DL/UL burst profile as well as a number of type length values ("TLVs") such as the bandwidth request code set domain, periodic ranging code domain, bandwidth request ranging backoff/end and periodic ranging start/end.

Regarding traffic scheduling, the R-MAP message is discussed above in detail. One or more IEs include the CID, burst description, i.e. duration, DIUC/UIUC, MIMO-related parameters and HARQ-related parameters. Regarding flow control, a flow control message ("R-FLW-CNTL") is used to implement the flow control process described above. The R-FLW-CNTL message includes a number of basic CIDs, in which for each basic CID there is an indication of the absolute data rate or change step as noted above.

As noted above, relay node 14 can assist mobile station 16 with network entry. In accordance therewith, an "R_ranging_detection" message is defined for communication between relay node 14 and base station 12. The "R_ranging_detection" message includes ranging code attributes of first step ranging and may also include time/power adjustment data and an assigned dedicated code for the second step ranging. The present invention also contemplates an "R_AP_switch" to facilitate and support AP switching when sent from the old (first) AP to base station 12. The message includes the basic CID of mobile station 16 requesting the AP switching. When sent from the target (second) base station 12 to the old (first) base station 12, the "R_AP_switch" message includes the assigned temporary code for the first step AP switch ranging. When sent from base station 12 to target relay node 14, the "R_AP_switch" message includes the assigned code that the target relay node 14 needs to monitor. Further, an "R_ranging_detection" message for use between relay node 14 and base station 12 is used to provide the code detected on the common AP switch region. Of note, although particular names have been defined for the above-described messages, the present invention is not limited solely to the use of these names. Any name can be used to define these messages, it being understood that the data carried within the message is the relevant aspect.

Standards, such as the 802.11 standards already define certain MAC control plane management messages. In accordance with the present invention, these MAC management messages can be enhanced. For example, the DCD of base station 12 is enhanced such as for each relay node 14 in the coverage region 22, DCD includes the R-ID, preamble index, transmission region, and uplink cell identification. The UCD of base station 12 is enhanced to include the common initial ranging region and code division and common AP switch region and code division as discussed herein. UL-MAP of base station 12 is enhanced to include the common AP switch region as discussed herein. The "MOB_scan_report" message for mobile station 16 is enhanced to include the preference of mobile station 16 regarding the access point from which it wishes to receive broadcast control messages. The "MOB_scan_report" can also include the signal strength. The "RNG-REQ" for relay node 14 is enhanced to include the R-ID of the relay node. Finally, the "anchor_switch" information element for relay node 14 includes the temporary code assigned by base station 12.

Sleep/Idle Mode Operation

It is contemplated that the present invention supports a sleep/idle mode to conserve transmission resources and battery power. The sleep/idle mode is suitable for the operational embodiments shown in FIGS. 2 and 4. Of note, sleep/idle mode is meaningful only within a cell, i.e., coverage region 22. In that regard, mobile station 16 monitors the base station 12 during a predefined listening/paging window. In such case, ranging is only done to base station 12 and an intra-base station switch does not trigger an access point switch in the case of sleep/idle mode operation.

The present invention advantageously provides and defines a comprehensive system and method for implementing MAC layer control plane functionality for wireless communication networks using stationary relay nodes. The present invention provides a set of functions and defines novel MAC control layer messages.

The present invention can be realized in hardware, software, or a combination of hardware and software. Any kind of computing system, or other apparatus adapted for carrying out the methods described herein, is suited to perform the functions described herein.

A typical combination of hardware and software could be a specialized or general purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

The invention claimed is:

1. A method for using a communication network having a relay node to provide wireless communication with a mobile station, the method comprising:
 establishing a ranging region with the mobile station, the establishment of the ranging region including the transmission of control information corresponding to the relay node, and responsive to the control information, transmitting, by the relay node, a code to a base station to indicate to the base station that the relay node has been selected by the mobile station from a plurality of relay nodes;
 allowing the mobile station to enter the communication network; using the relay node to wirelessly communicate directly with the mobile station in an uplink direction; and using the base station to bypass the relay node to communicate directly with the mobile station in a downlink direction.

2. The method according to claim 1, further comprising using the relay node to provide wireless communication service with the mobile station in a base station coverage hole.

3. The method according to claim 1, further comprising using the relay node to provide wireless communication service with the mobile station at an outer region of a base station coverage region.

4. The method according to claim 1, further comprising using the relay node to supplement the wireless communication capacity of a base station in a corresponding base station coverage region.

5. The method according to claim 1, further comprising using the relay node as an air protocol translation device to translate between a first protocol used between the mobile station and the relay node, and a second protocol used between the relay node and a base station, the first protocol being different than the second protocol.

6. The method according to claim 1, wherein establishing a ranging region with the mobile station includes providing a common access point switch ranging region.

7. The method according to claim 1, wherein allowing the mobile station to enter the network includes monitoring a down link channel description message and an uplink channel description message for information related to the relay node.

8. The method according to claim 7, wherein allowing the mobile station to enter the network further includes selecting an access point, the access point being one of a relay node and a base station.

9. The method according to claim 1, wherein a frame structure for using the relay node to wirelessly communicate with the mobile station in at least one of the uplink and downlink directions includes a downlink sub frame and an uplink sub frame, a portion of the downlink sub frame being allocated for communication to the mobile station from the relay node and a portion of the uplink sub frame being allocated for communication to the relay node from the mobile station.

10. The method according to claim 9, wherein the portion of the downlink sub frame allocated for communication to the mobile station from the relay node includes resource allocation signaling mapping information.

11. The method according to claim 1, further comprising handing off communication to a selected target relay node based on a macro diversity set, the macro diversity set including a list of potential target relay nodes for communication hand off.

12. The method according to claim 11, wherein the target relay node is in a same base station coverage region as the relay node.

13. The method according to claim 11, wherein the target relay node is in a different base station coverage region as the relay node.

14. The method according to claim 1, further comprising performing flow control with the relay node to facilitate hand off, the flow control being based on at least one of an upper bound of a communication data rate with the relay node and a hand off action time.

15. The method according to claim 1, further comprising establishing MAC management messages for communication with a relay node, the MAC management messages including messages corresponding to configuration, traffic scheduling, flow control, network entry and access point switching messages.

16. A system for wirelessly communicating with a mobile station, the system comprising:
a relay node, the relay node configured to:
monitor a common initial ranging region, a common access point switch ranging region and a private ranging region to range with the mobile station;
range with the mobile station;
use MAC control plane messages to establish wireless communications with the mobile station; and
wirelessly communicate with the mobile station in the an uplink direction, the relay node being bypassed in a downlink direction between a base station and the mobile station.

17. The system according to claim 16, wherein the relay node is configured to provide wireless communication service with the mobile station in a base station coverage hole.

18. The system according to claim 16, further comprising using the relay node to provide wireless communication service with the mobile station at an outer region of a base station coverage region.

19. The system according to claim 16, wherein the relay node is configured to supplement the wireless communication capacity of a base station in a corresponding base station coverage region.

20. The system according to claim 16, wherein the system further includes a base station, and the relay node configured to translate between a first protocol used between the mobile station and the relay node, and a second protocol used between the relay node and a base station, the first protocol being different than the second protocol.

21. The system according to claim 16, wherein the relay node is configured to use a frame to wirelessly communicate with the mobile station in at least one of the uplink and downlink directions, the frame including a downlink sub frame and an uplink subframe, a portion of the downlink sub frame being allocated for communication to the mobile station from the relay node and a portion of the uplink subframe being allocated for communication to the relay node from the mobile station.

22. The system according to claim 21, wherein the portion of the downlink sub frame allocated for communication to the mobile station from the relay node includes resource allocation signaling mapping information.

23. The system according to claim 16, wherein the relay node is configured to perform flow control with one of another relay node and a base station to facilitate hand off, the flow control being based on at least one of an upper bound of a communication data rate with the relay node and a hand off action time.

24. The system according to claim 16, wherein the relay node is configured to use MAC management messages for communication, the MAC management messages including messages corresponding to configuration, traffic scheduling, flow control, network entry and access point switching messages.

25. The system according to claim 16, wherein the base station is in communication with the relay node, and the relay node is configured to use MAC messages to communicate MAC control plane information, the MAC messages including at least one of messages corresponding to configuration, traffic scheduling, flow control, network entry and access point switching messages.

26. The method of claim 1, wherein, responsive to receiving the code from the relay node, the base station transmits a RNG-RSP message directly to the mobile station.

27. The method of claim 26, wherein, responsive to receiving the RNG-RSP message from the base station, the mobile station transmits a ranging code assigned by the relay node to the relay node.

28. The method of claim 27, wherein, responsive to receiving the ranging code from the mobile station, the relay node transmits an RNG-RSP response message to the mobile station.

29. A relay node, comprising:
a process configured to:
monitor a common initial ranging region, a common access point switch ranging region and a private ranging region to range with the mobile station;

range with a mobile station;
use MAC control plane messages to establish wireless communications with the mobile station; and
wirelessly communicate with the mobile station in the an uplink direction, the relay node being bypassed in a downlink direction between a base station and the mobile station.

30. The relay node of claim 29, wherein the processor is configured to monitor a first ranging region and monitor a second ranging region during establishment of the uplink communication between the wireless mobile station and the relay node, the first ranging region being different from the second ranging region.

\* \* \* \* \*

UNITED STATES PATENT AND TRADEMARK OFFICE
CERTIFICATE OF CORRECTION

PATENT NO.       : 8,660,035 B2                     Page 1 of 1
APPLICATION NO.  : 12/092797
DATED            : February 25, 2014
INVENTOR(S)      : Hang Zhang et al.

It is certified that error appears in the above-identified patent and that said Letters Patent is hereby corrected as shown below:

In the Claims:

Claim 16, Column 21, Line 62, please delete "in the an" and substitute -- in an --

Claim 29, Column 23, Line 4-5, please delete "in the an" and substitute -- in an --

Signed and Sealed this
Seventeenth Day of June, 2014

Michelle K. Lee
*Deputy Director of the United States Patent and Trademark Office*